United States Patent
Ghezzi et al.

(10) Patent No.: US 11,435,213 B2
(45) Date of Patent: *Sep. 6, 2022

(54) SELF-DOSING MEASURING CAP FOR A LIQUID CONTAINER

(71) Applicant: Grove Collaborative, Inc., San Francisco, CA (US)

(72) Inventors: Gloria Ghezzi, Shanghai (CN); Jianfeng Zhang, Shanghai (CN); Jonathan Chayet Silverman, Mill Valley, CA (US)

(73) Assignee: Grove Collaborative, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/168,075

(22) Filed: Feb. 4, 2021

(65) Prior Publication Data
US 2021/0404852 A1 Dec. 30, 2021

Related U.S. Application Data

(63) Continuation of application No. 16/578,939, filed on Sep. 23, 2019, now Pat. No. 10,942,052, which is a continuation of application No. 16/233,646, filed on Dec. 27, 2018, now Pat. No. 10,444,049.

(51) Int. Cl.
| | | |
|---|---|---|
| *G01F 11/26* | (2006.01) | |
| *B65D 5/74* | (2006.01) | |
| *B65D 47/06* | (2006.01) | |
| *B65D 51/24* | (2006.01) | |

(52) U.S. Cl.
CPC ............ *G01F 11/262* (2013.01); *B65D 5/746* (2013.01); *B65D 47/06* (2013.01); *B65D 51/24* (2013.01)

(58) Field of Classification Search
CPC ...... G01F 11/262; G01F 11/26; G01F 11/261; G01F 11/268; B65D 5/746; B65D 47/06; B65D 51/24
See application file for complete search history.

(56) References Cited

U.S. PATENT DOCUMENTS

| | | | | |
|---|---|---|---|---|
| 1,859,109 | A | * 5/1932 | Oswell | A47G 19/34 222/455 |
| 2,091,929 | A | * 8/1937 | Kappenberg | G01F 11/262 222/455 |
| 2,208,862 | A | 7/1940 | Stringfellow | |
| 2,233,996 | A | 3/1941 | Dent | |
| 2,241,840 | A | 5/1941 | Achtziger | |

(Continued)

FOREIGN PATENT DOCUMENTS

WO    WO 2020/140010     7/2020

*Primary Examiner* — Vishal Pancholi
*Assistant Examiner* — Bob Zadeh
(74) *Attorney, Agent, or Firm* — Dykema Gossett PLLC

(57) ABSTRACT

In some embodiments, a system for dispensing liquid from a container holding a liquid comprises a reservoir mountable to the container so as to be in fluidic communication with the container. The reservoir may comprise an inlet and an outlet. When mounted to the container, the reservoir may be configured to measure a predetermined quantity of liquid while in first orientation and to simultaneously dispense the predetermined quantity of liquid from the outlet and receive a refilling quantity of liquid through the inlet while in a second orientation that is angled relative to the first orientation above a threshold angle.

20 Claims, 20 Drawing Sheets

(56) References Cited

U.S. PATENT DOCUMENTS

| | | |
|---|---|---|
| 2,760,692 A | 8/1956 | Buehlig |
| 2,834,519 A | 5/1958 | Miller |
| 2,943,767 A | 7/1960 | Moro-Lin |
| 3,023,937 A | 3/1962 | Matter |
| 3,146,919 A | 9/1964 | Chappell |
| 3,233,797 A | 2/1966 | Conry |
| 3,288,335 A | 11/1966 | Steffens |
| 3,687,341 A | 8/1972 | Stanley et al. |
| 3,833,150 A | 9/1974 | Visser-Patings |
| 4,015,758 A | 4/1977 | Cavazza |
| 4,061,253 A * | 12/1977 | Rockefeller .......... G01F 11/262 222/442 |
| 4,438,869 A | 3/1984 | Vierkotter et al. |
| 4,660,746 A | 4/1987 | Wright |
| 4,811,871 A | 3/1989 | Wass et al. |
| 5,129,561 A * | 7/1992 | Drobish ................ G01F 11/262 222/455 |
| 5,143,261 A | 9/1992 | Drobish |
| 5,392,966 A | 2/1995 | Bunin |
| 5,495,964 A | 3/1996 | Santagiuliana |
| 5,695,093 A | 12/1997 | Lucius |
| 6,076,708 A | 6/2000 | Ceccarelli et al. |
| 6,164,498 A * | 12/2000 | Faughey ............ B05B 11/3008 222/153.13 |
| 6,378,741 B1 | 4/2002 | Loertscher |
| 6,892,905 B2 | 5/2005 | Cousseau |
| 6,997,358 B2 | 2/2006 | Wass |
| D552,403 S | 10/2007 | Renner |
| D587,060 S | 2/2009 | Chung |
| 8,851,333 B2 | 10/2014 | van de Poll |
| 9,003,879 B1 | 4/2015 | Honan et al. |
| 9,625,299 B2 | 4/2017 | Holden et al. |
| 10,444,049 B1 * | 10/2019 | Ghezzi ................... B65D 5/746 |
| D874,861 S | 2/2020 | Alexander |
| D899,172 S | 10/2020 | Burns et al. |
| D899,173 S | 10/2020 | Burns |
| 10,942,052 B2 * | 3/2021 | Ghezzi ................... G01F 11/262 |
| 2002/0070233 A1 * | 6/2002 | Angelos ................ G01F 11/262 222/109 |
| 2006/0081649 A1 | 4/2006 | Kerkhof et al. |
| 2009/0001104 A1 * | 1/2009 | Ranney ................ G01F 11/268 222/438 |
| 2010/0224650 A1 * | 9/2010 | Antal, Sr. .............. G01F 11/26 222/1 |
| 2011/0036934 A1 | 2/2011 | Antal et al. |
| 2011/0163118 A1 | 7/2011 | Gieda et al. |
| 2012/0248153 A1 * | 10/2012 | Peng ...................... G01F 11/262 222/454 |
| 2013/0062370 A1 * | 3/2013 | Nielsen ................ B65D 83/06 222/455 |
| 2015/0028063 A1 | 1/2015 | Skillin et al. |
| 2015/0217910 A1 | 8/2015 | Vogel et al. |
| 2020/0264026 A1 | 8/2020 | Ghezzi et al. |

* cited by examiner

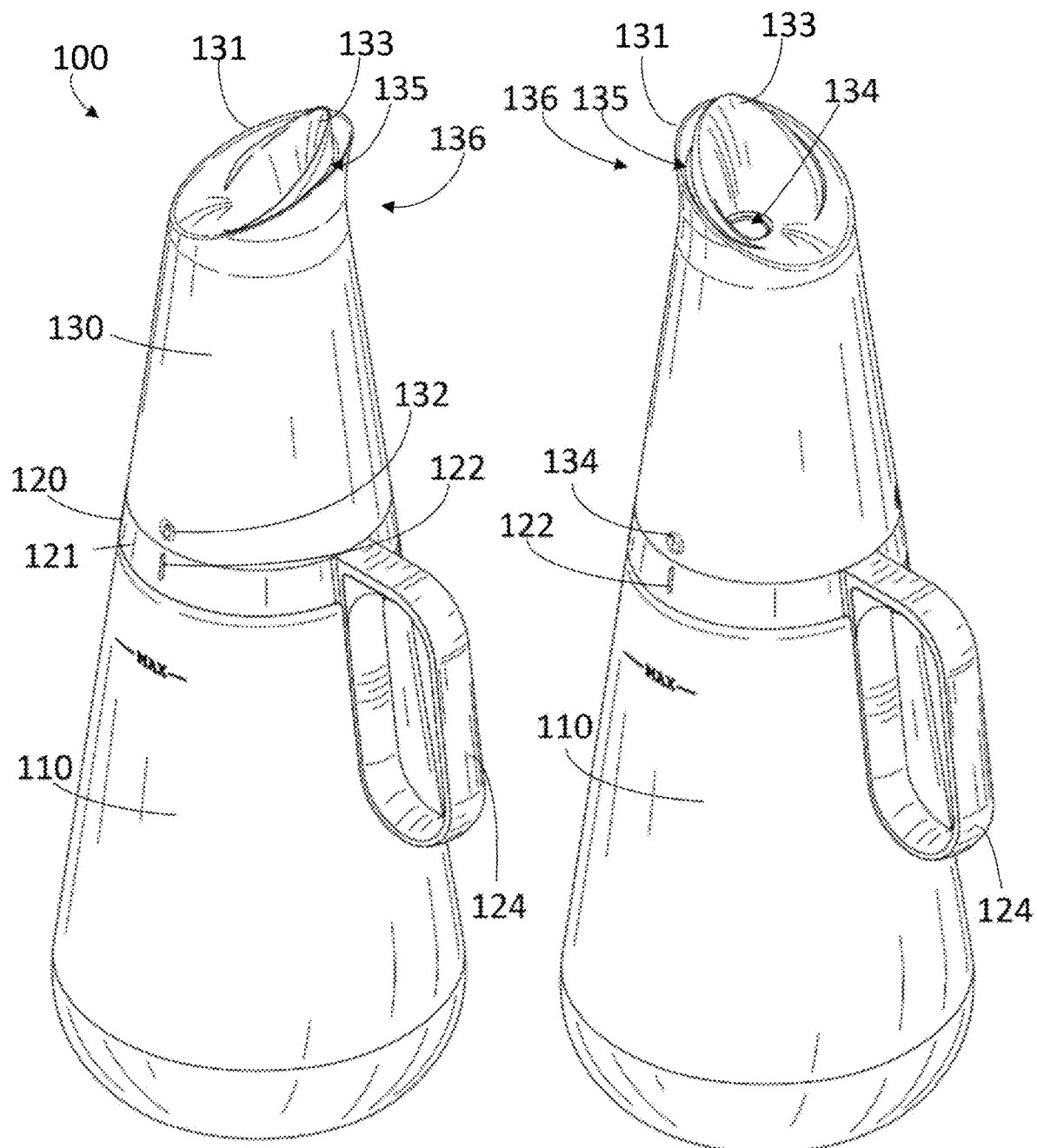

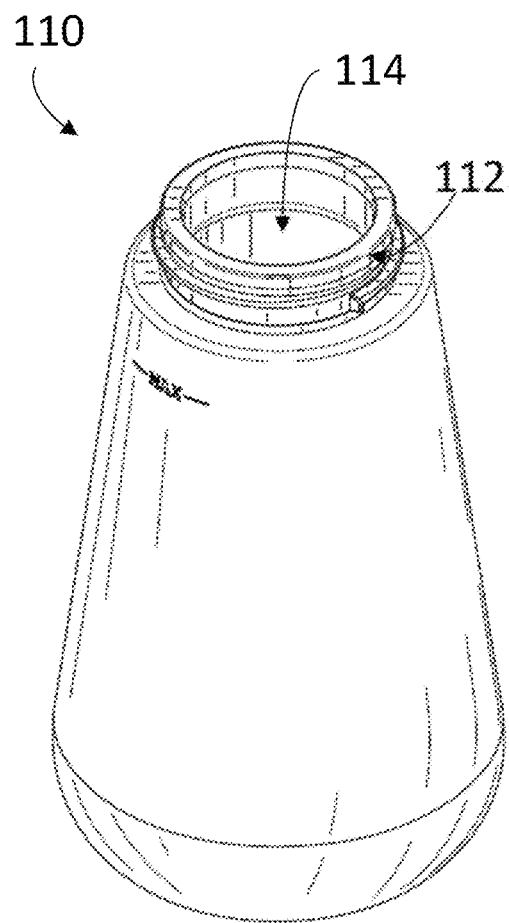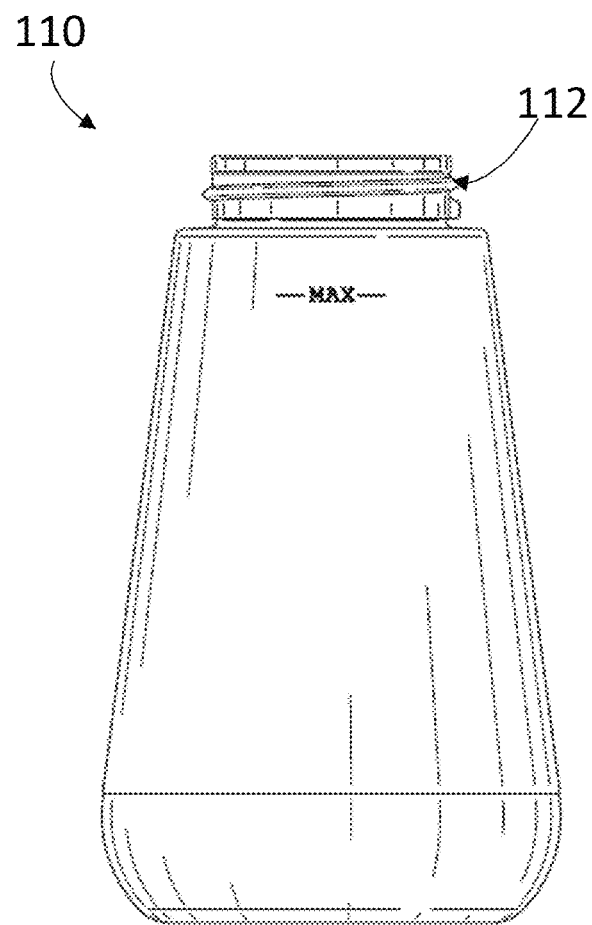
FIG. 8
FIG. 9

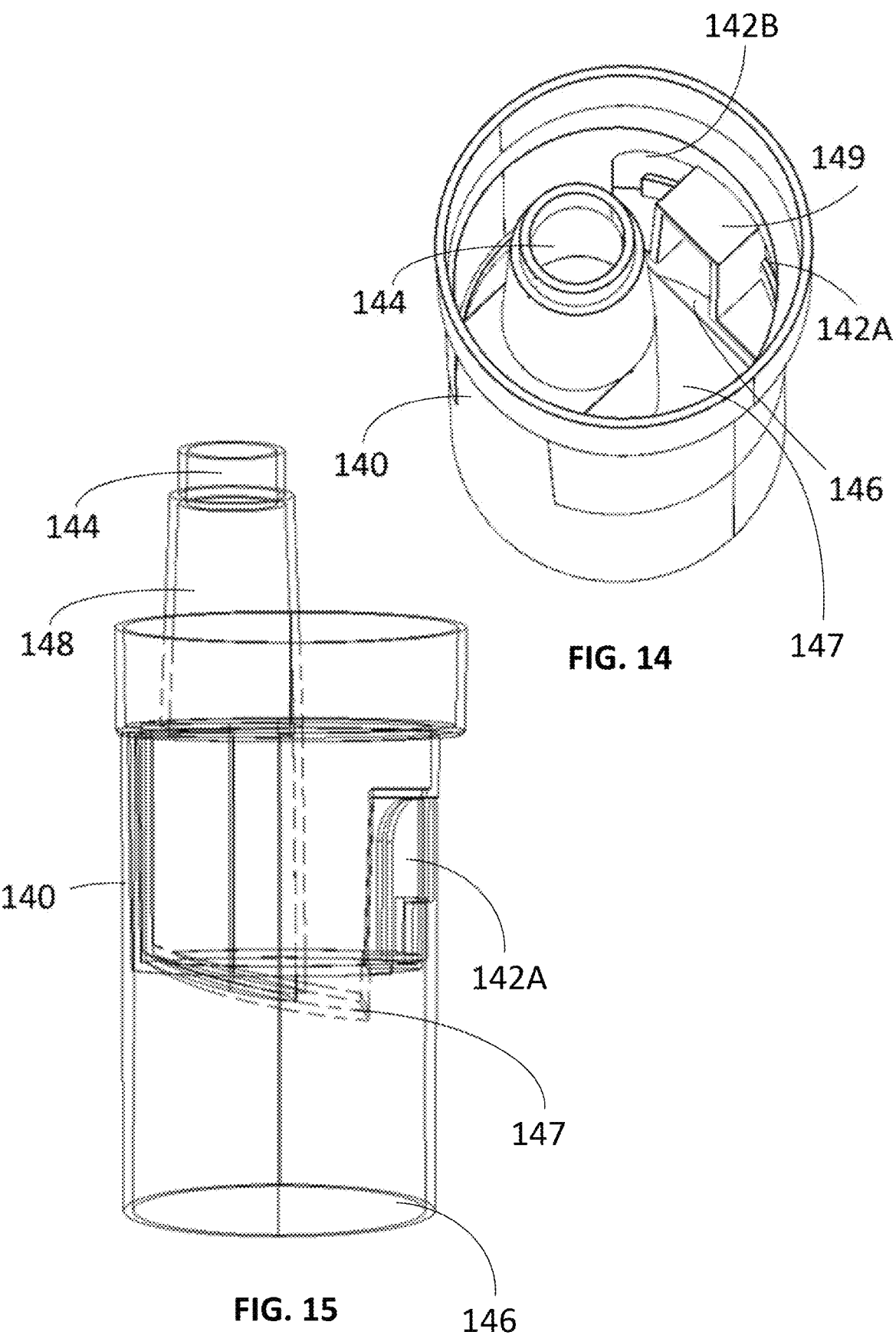

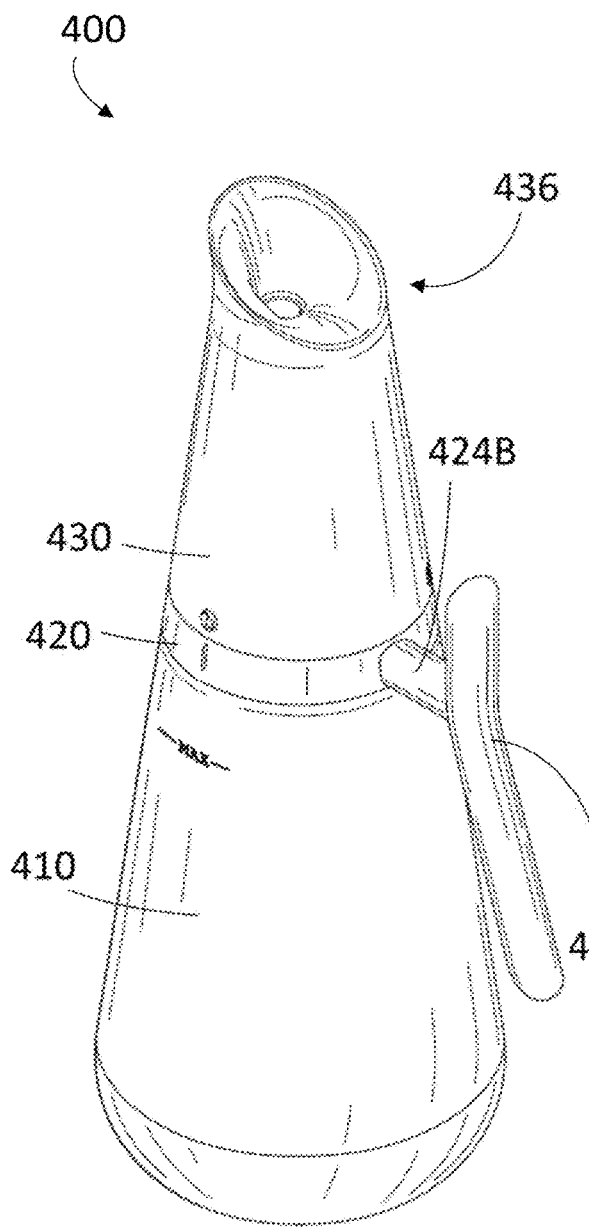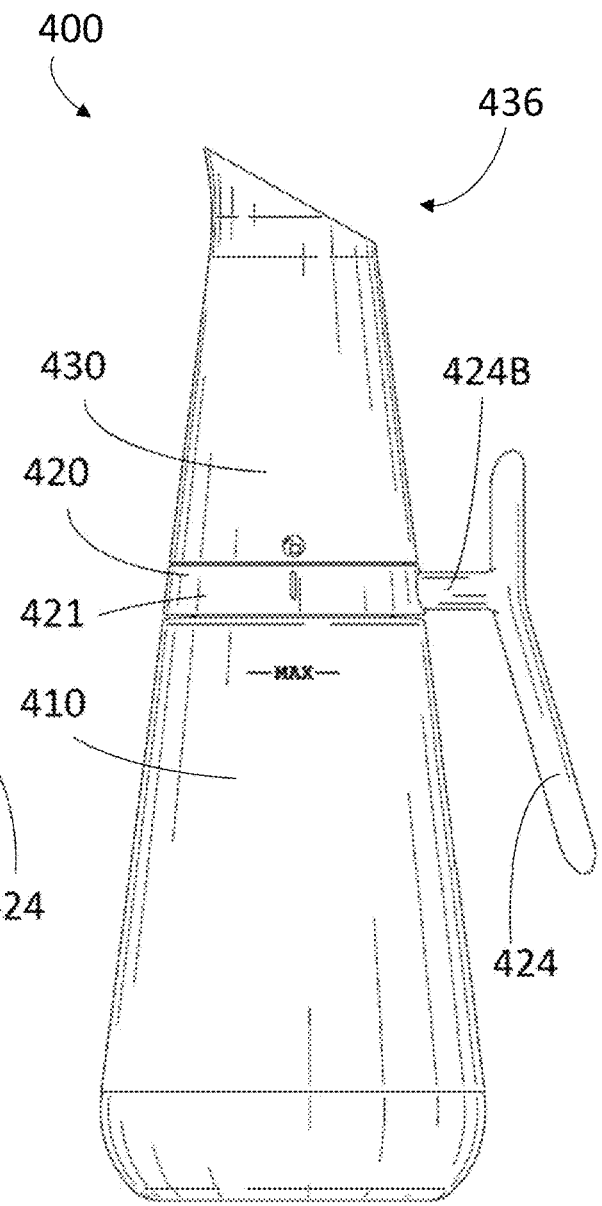
FIG. 25
FIG. 26

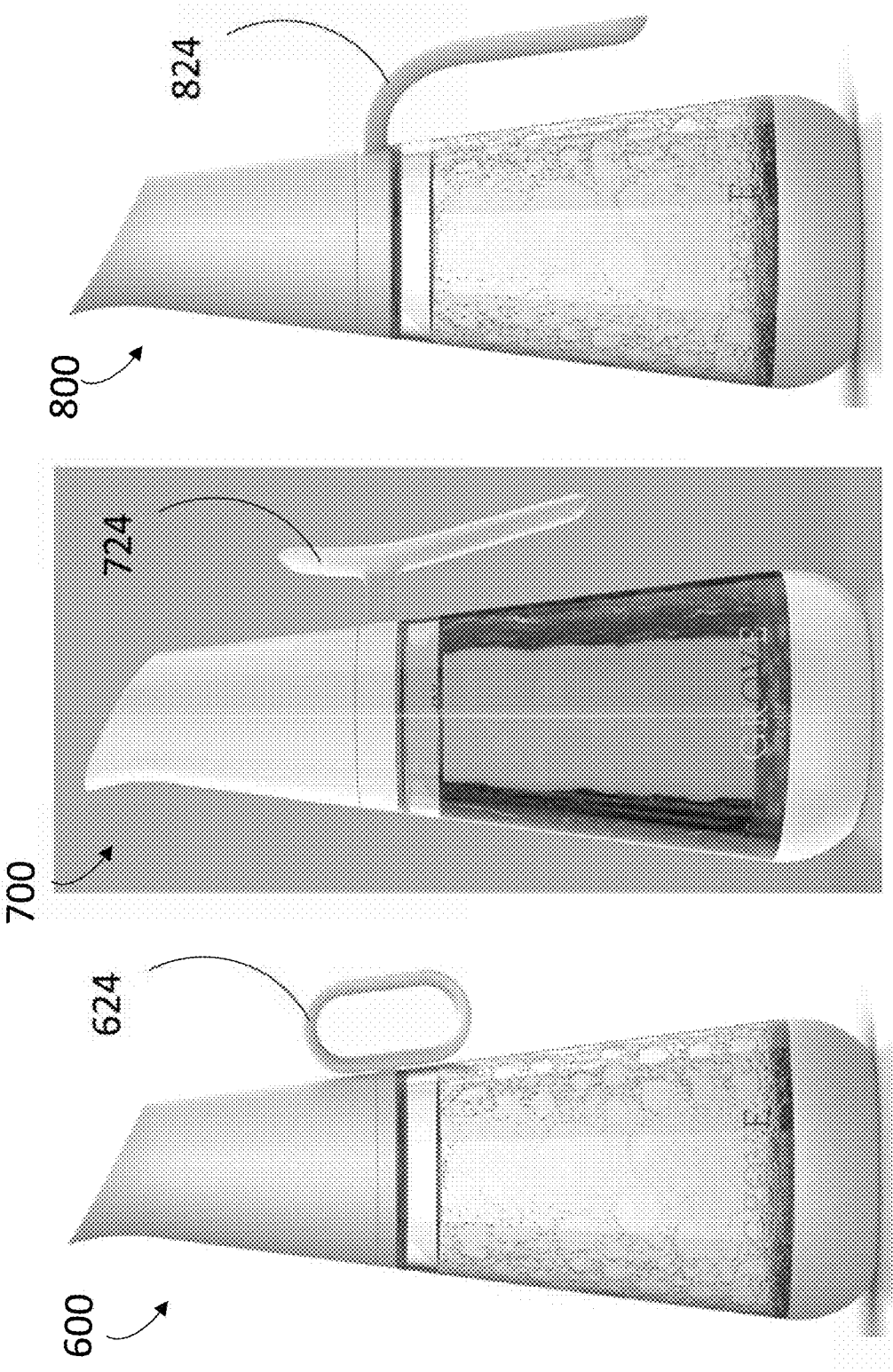

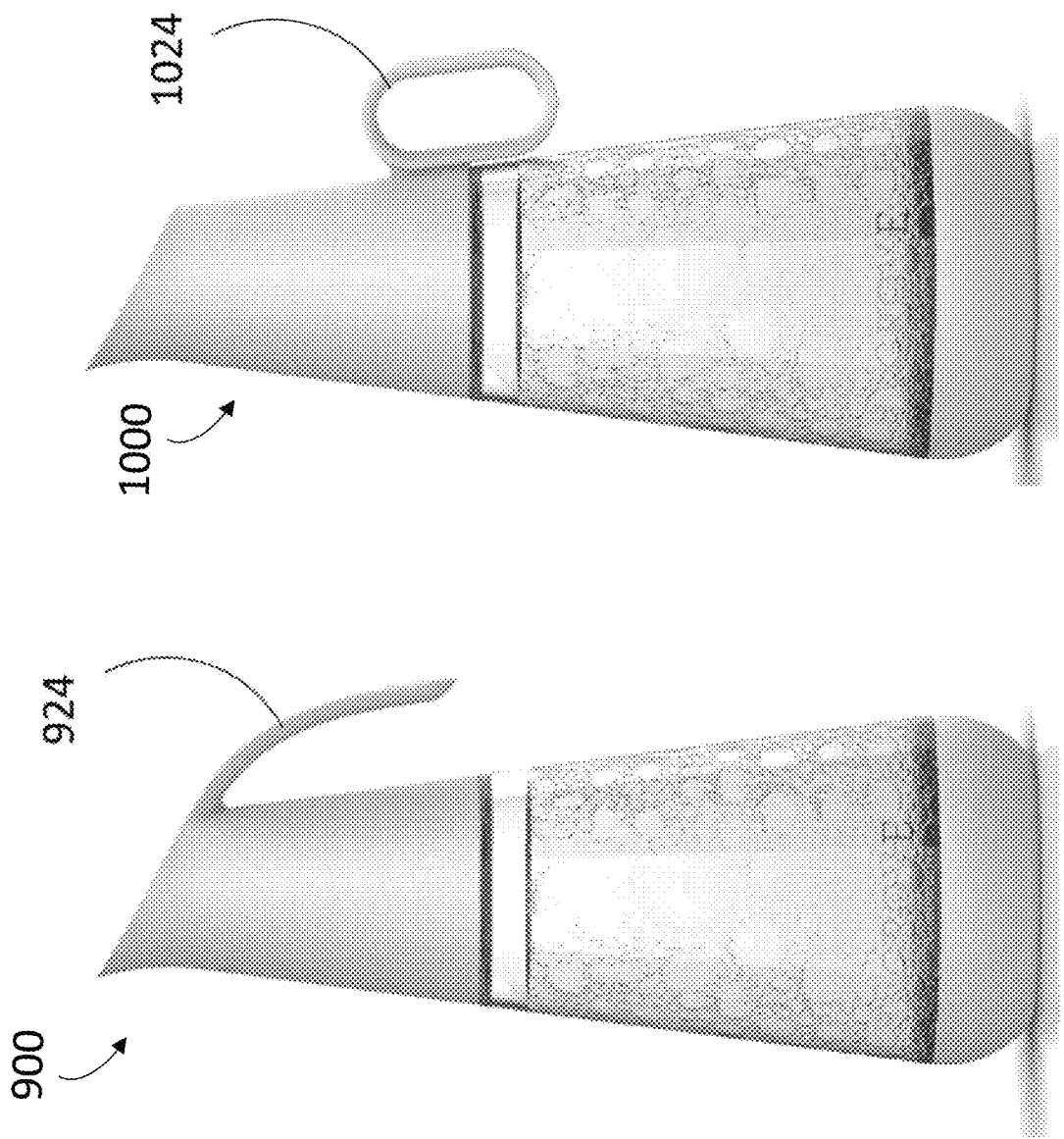

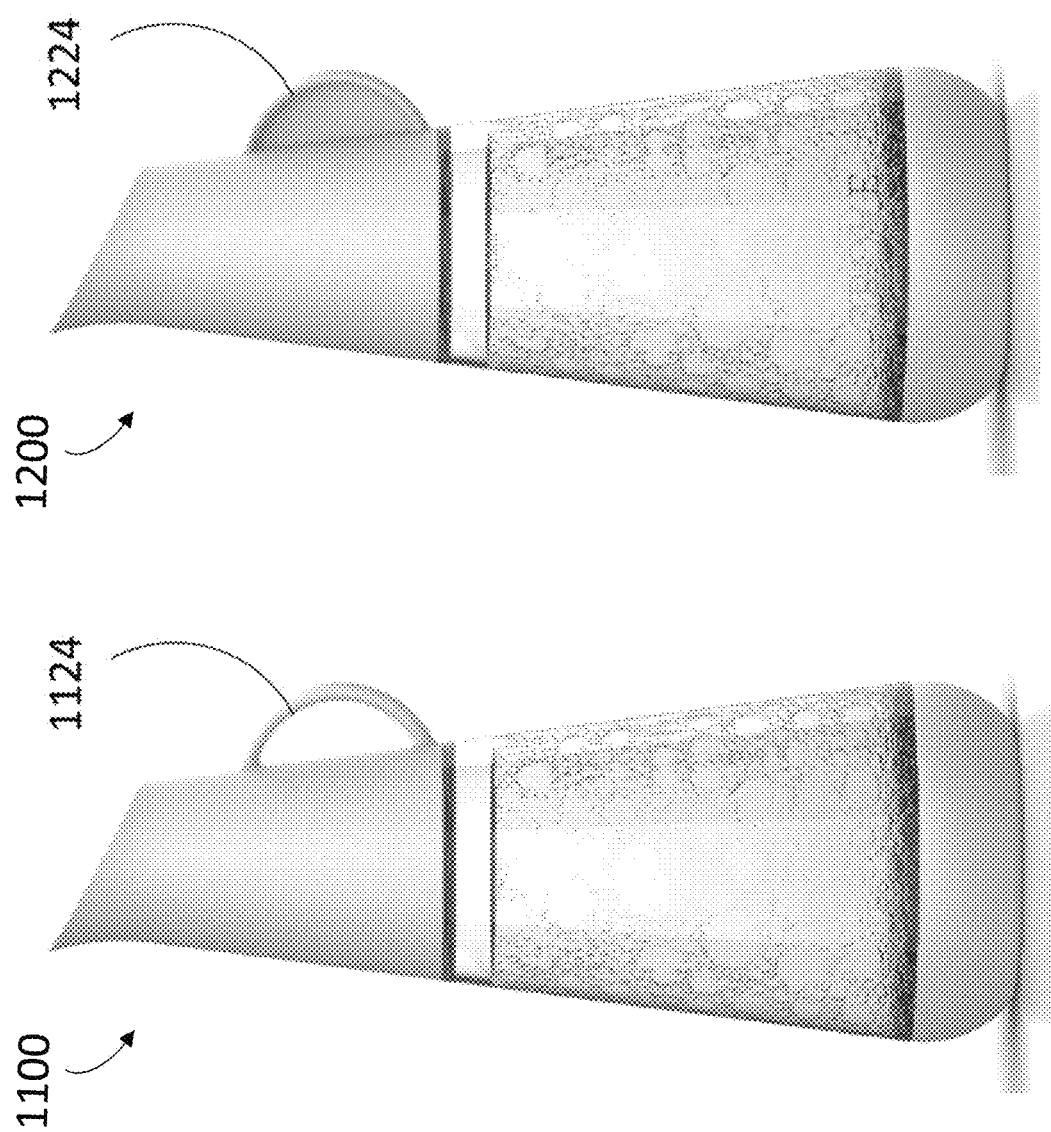

SELF-DOSING MEASURING CAP FOR A LIQUID CONTAINER

CROSS-REFERENCE TO RELATED APPLICATION

This application is a continuation of U.S. application Ser. No. 16/578,939, now U.S. Pat. No. 10,942,052, filed on Sep. 23, 2019, which is a continuation of U.S. application Ser. No. 16/233,646, now U.S. Pat. No. 10,444,049, filed on Dec. 27, 2018, the contents of each of which is incorporated herein by reference in its entirety for all purposes.

BACKGROUND

In many scenarios, it may be important to reliably and consistently measure a particular volume of liquid. For example, when measuring liquid laundry detergent (e.g., for use in a laundry washing machine), it is helpful to ensure an appropriate amount of laundry detergent is used. When too little liquid detergent is used, the user may not obtain the desired level of cleanliness. When too much liquid detergent is used, some of the liquid detergent is unnecessarily wasted and may even damage the clothing and/or washing machine during the laundry cycle. Some users visually estimate the amount of liquid detergent while pouring the liquid into a washing machine reservoir, but such visual estimation tends to be inaccurate. Other users approach this problem by using a measuring cup to portion out a desired amount of liquid detergent. However, pouring detergent into a measuring cup is messy, inconvenient, and time-consuming. Thus, there is a need for a system, apparatus, and method to improve the ease and accuracy of dispensing a predetermined quantity of a liquid.

SUMMARY

In some embodiments, a system for dispensing liquid from a container holding a liquid comprises a reservoir mountable to the container so as to be in fluidic communication with the container. The reservoir may comprise an inlet and an outlet. When mounted to the container, the reservoir may be configured to measure a predetermined quantity of liquid while in first orientation and to simultaneously dispense the predetermined quantity of liquid from the outlet and receive a refilling quantity of liquid through the inlet while in a second orientation that is angled relative to the first orientation above a threshold angle.

BRIEF DESCRIPTION OF THE DRAWINGS

FIGS. 1-6 are various external views of a system for dispensing liquid from a container holding a liquid, according to an embodiment. FIG. 1 is a perspective view of the system in a locked configuration. FIG. 2 is a perspective view of the system in an unlocked configuration. FIGS. 3 and 4 are front and rear views, respectively, of the system in an unlocked configuration. FIGS. 5 and 6 are top and bottom views, respectively, of the system in an unlocked configuration.

FIG. 8 is a perspective view of a container of the system of FIG. 1.

FIG. 9 is a front view of the container of FIG. 8.

FIG. 14 is a perspective view of a top of the reservoir shown in FIG. 7.

FIG. 15 is perspective view of the reservoir shown in FIG. 7.

FIGS. 25 and 26 are a perspective view and a front view, respectively, of a system, according to an embodiment.

FIG. 30 is a front view of a system having a handle, according to an embodiment.

FIG. 31 is a front view of a system having a handle, according to an embodiment.

FIG. 32 is a front view of a system having a handle, according to an embodiment.

FIG. 33 is a front view of a system having a handle, according to an embodiment.

FIG. 34 is a front view of a system having a handle, according to an embodiment.

FIG. 35 is a front view of a system having a handle, according to an embodiment.

FIG. 36 is a front view of a system having a handle, according to an embodiment.

DETAILED DESCRIPTION

Figures 3, 4:
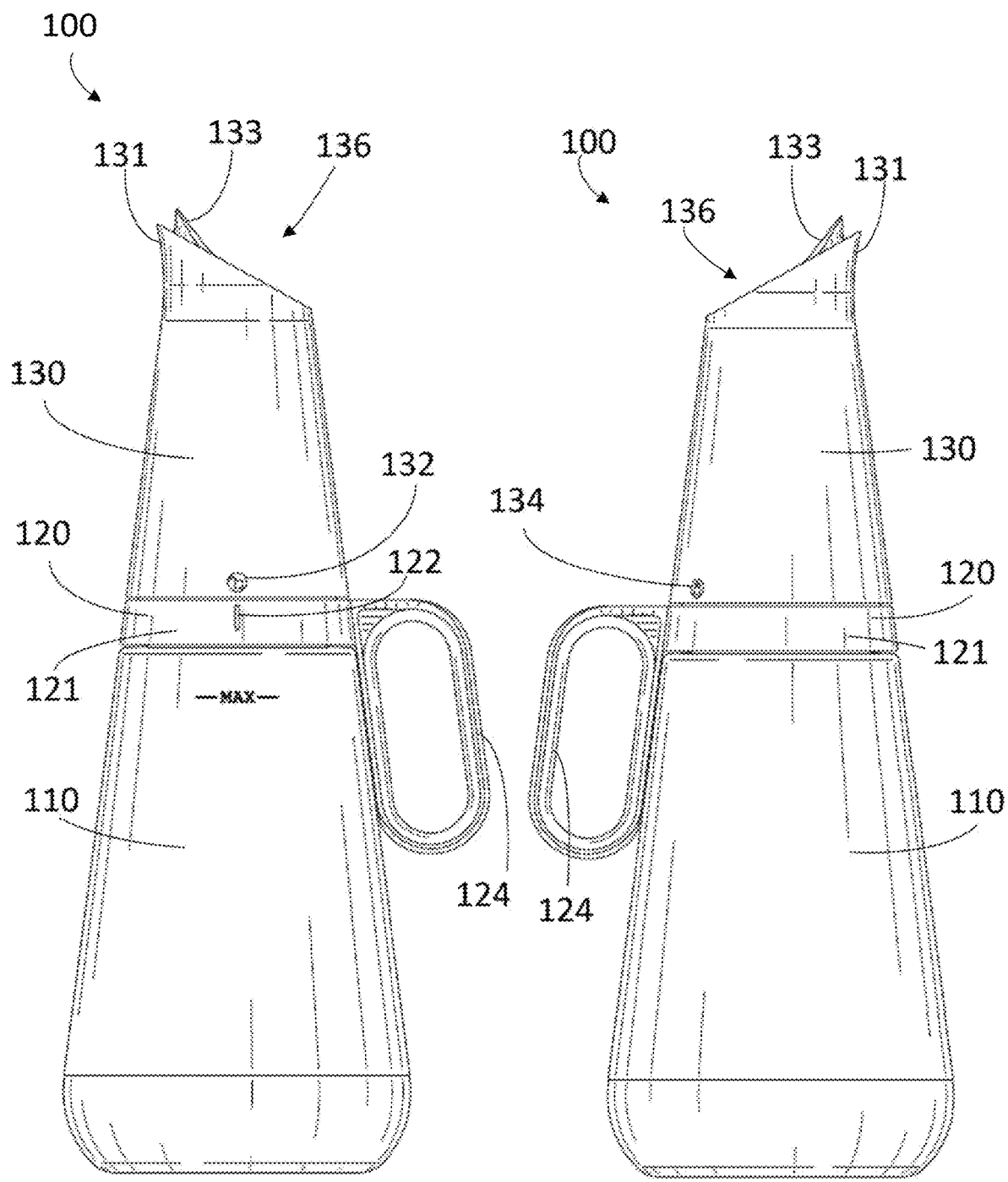

In some embodiments, a system for dispensing liquid from a container holding a liquid comprises a reservoir mountable to the container so as to be in fluidic communication with the container. The reservoir may comprise an inlet and an outlet. In some embodiments, the reservoir may comprise a second inlet. When mounted to the container, the reservoir may be configured to measure a predetermined quantity of liquid while in first orientation and to simultaneously dispense the predetermined quantity of liquid from the outlet and receive a refilling quantity of liquid through the inlet while in a second orientation that is angled relative to the first orientation above a threshold angle. In some embodiments, the predetermined quantity of liquid may be defined at least in part by the location of the inlet relative to a reservoir bottom.

In some embodiments, the outlet of the reservoir may be disposed at an end of a tubular member extending away from a reservoir bottom. The tubular member may comprise at least a partial flange disposed proximate the inlet of the reservoir.

The system may further comprise a cover disposed over the reservoir. The system may further comprise an annular space defined between the reservoir and the cover, wherein the reservoir is in fluidic communication with the container via the annular space. The system may further comprise a spout having an opening aligned with the outlet of the reservoir. The spout may comprise a double-lipped edge. The opening may be off-center. The opening and the inlet may be on opposite sides of a midplane of the reservoir.

In some embodiments, a system for dispensing liquid from a container holding a liquid comprises a reservoir mountable to the container so as to be in fluidic communication with the container. The reservoir may comprise an inlet and an outlet. In some embodiments, the reservoir may comprise a second inlet. When mounted to the container, the reservoir may be configured to measure a predetermined quantity of liquid while in an upright orientation and to simultaneously dispense the predetermined quantity of liquid from the outlet and receive a refilling quantity of liquid through the inlet while in a rotated orientation that is angled relative to the upright orientation. In some embodiments, the predetermined quantity of liquid may be defined at least in part by the location of the inlet relative to a reservoir bottom.

In some embodiments, the outlet of the reservoir may be disposed at an end of a tubular member extending away from a reservoir bottom. The tubular member may comprise at least a partial flange disposed proximate the inlet of the reservoir.

The system may further comprise a cover disposed over the reservoir. The system may further comprise an annular space defined between the reservoir and the cover, wherein the reservoir is in fluidic communication with the container via the annular space. The system may further comprise a spout having an opening aligned with the outlet of the reservoir. The spout may comprise a double-lipped edge. The opening may be off-center. The opening and the inlet may be on opposite sides of a midplane of the reservoir.

In some variations, the system is used to store, measure, and dispense a liquid laundry detergent from a container. However, one or more features of the system may additionally or alternatively be used to store, measure, and/or dispense any suitable liquid. For example, the reservoir described herein may be combined with other containers and/or dispensers to enable self-measurement of a predetermined amount of liquid.

Figure 5:
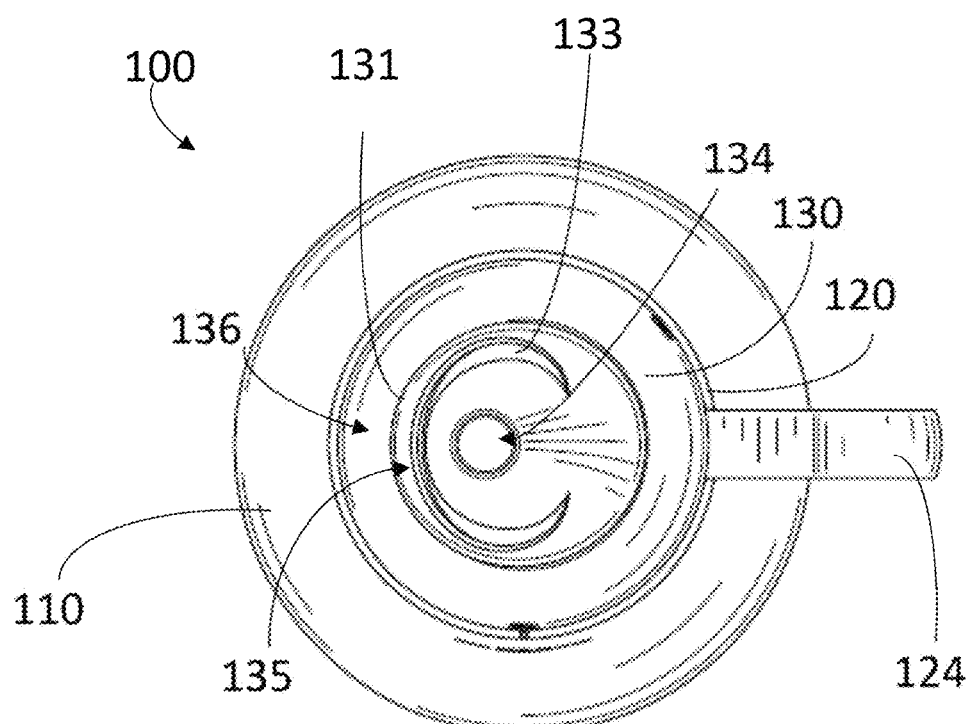
Figure 6:
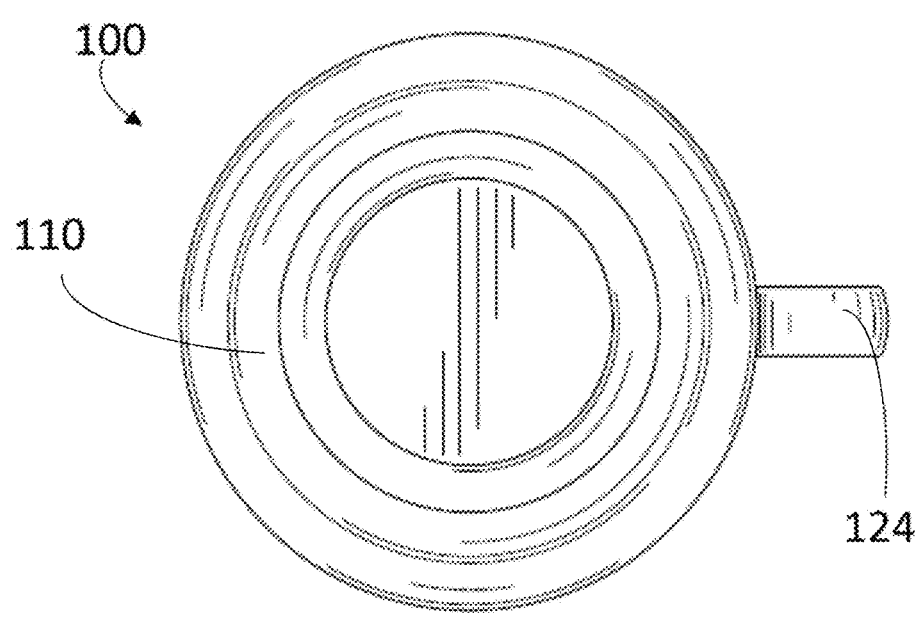

FIGS. 1-6 are various external views of a system 100 for dispensing liquid from a container holding a liquid. Specifically, FIGS. 1 and 2 are a perspective view of a system 100 in a locked configuration and an unlocked configuration, respectively. FIGS. 3 and 4 are a front view and a rear view of the system 100 in the unlocked configuration. FIGS. 5 and 6 are a top view and a bottom view of the system 100 in the unlocked configuration, respectively. As shown, the system 100 includes a container 110, an intermediate portion 120, and an upper housing 130.

The intermediate portion 120 may include an annular ring 121 and a handle 124 coupled to the annular ring 121. However, in some variations the intermediate portion 120 may omit a handle, and/or a handle may be coupled to the container 110, and the upper housing 130, or any suitable portion of the system. An indicator mark 122 may be disposed on the annular ring 121, though in some variations the indicator 112 may be disposed on the container 110. The indicator mark 122 may be a tactile feature such as, for example, a notch such as a recess, or a raised feature. The indicator mark 122 alternatively may be an etching or decal. The upper housing 130 may include a first indicator 132 and a second indicator 134. The upper housing 130 is rotatable relative to the intermediate portion 120 and the container 110 between the locked configuration and the unlocked configuration. When in the locked configuration, the system 100 may be prevented from dispensing liquid. When in the locked configuration, the system 100 may be able to dispense a predetermined quantity of liquid per pouring action (e.g., per inversion or sufficient rotation of the system 100). The first indicator 132 may be aligned with the indicator mark 122 when the system 100 is in the locked configuration. The second indicator 134 may be aligned with the indicator mark 122 when the system 100 is in the unlocked configuration. As shown in FIGS. 1 and 2, the first indicator 132 may be a graphic icon depicting a lock symbol, while the second indicator 134 may be a graphic icon depicting an unlocked symbol. Additionally or alternatively, the first and second indicators may include text (e.g., "LOCK", "UNLOCK", "L", "U") and/or other suitable representative symbols (e.g., a filled circle representing a lock setting, unfilled circle representing an unlocked setting), etc. Like the indicator mark 122, the first indicator 132 and second indicator 134 may be a tactile feature such as a notch or raised feature, or may be an etching or decal. In variations in which the indicator mark 122, first indicator 132, and/or second indicator 134 includes a tactile feature, the tactile feature may enable a user to detect through feel alone whether the system 100 is in the unlocked or locked configuration.

In some variations, the intermediate portion 120 may be made of a rigid or semi-rigid material such as a rigid plastic that is formed, for example, through injection molding or any suitable process.

The upper housing 130 may include a spout 136. As shown, for example, in FIG. 2, the spout 136 may define an opening 134. Generally, the spout 136 may include a linearly or arcuately sloping surface configured to guide liquid being poured out of the opening 134 (e.g., when the system 100 is rotated or tilted) and/or guide residual liquid back into the reservoir when the system 200 is restored upright. The spout 136 may include a double-lipped edge. For example, the spout 136 may include a first lip 131 and a second lip 133. A groove 135 may be defined between the first lip 131 and the second lip 133. The groove 135 may be defined so as to capture at least some residual liquid and substantially preventing the residual liquid from dripping over an exterior of the upper housing 130. The groove 135 may be defined such that, when residual liquid is disposed between the first lip 131 and the second lip 133 (e.g., after being poured from the spout 132) and the system 100 is in an upright orientation, the residual liquid may flow under force of gravity into the opening 134. For example, the groove 135 may be generally arcuate and terminate at one or more of its ends at the sloping surface of the spout 136. In some variations, the upper housing 130 may be made of a rigid or semi-rigid material such as a rigid plastic that is formed, for example, through injection molding or any suitable process.

Figure 7:
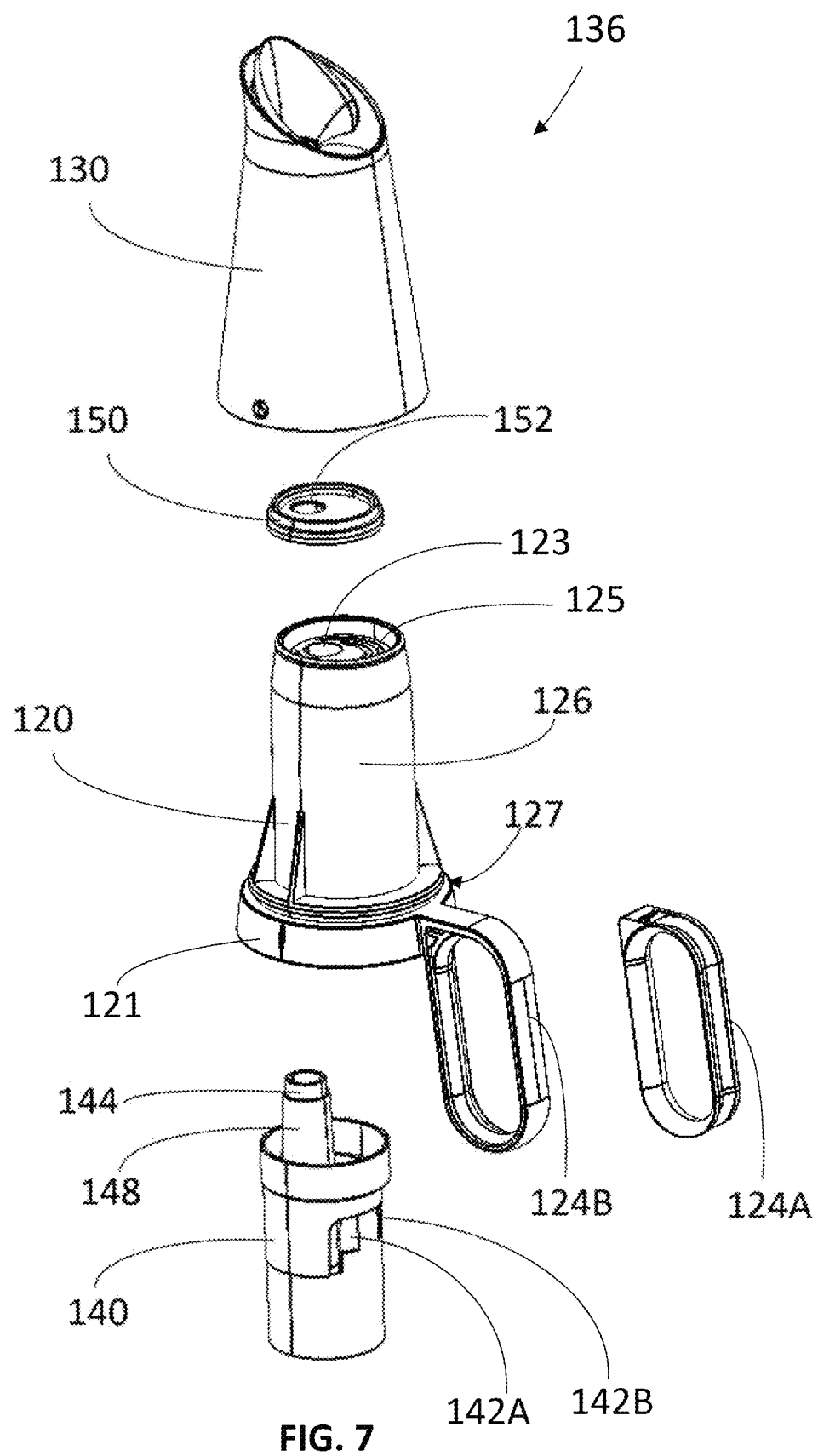
FIG. 7 is a perspective view of a portion of the system of FIGS. 1-6 in an exploded configuration.

FIG. 7 is a perspective view of a portion of the system 100 in an exploded configuration. As shown, the system 100 includes a reservoir 140, an intermediate portion 120, a cap 150, and an upper housing 130. The reservoir 140 defines a first inlet 142A and a second inlet 142B. The reservoir 140 also includes a tubular member 148 defining an outlet 144.

Although the reservoir 140 is shown and described as having a first inlet 142A and a second inlet 142B, in some embodiments the reservoir 140 may include only one inlet, or three or more inlets.

As shown in FIG. 7, the intermediate portion 120 includes a cover 126 extending upward from the annular ring 121. The cover 126 is configured (e.g., shaped and sized) such that the cover 126 may be disposed within an interior of the upper housing 130 when the system 100 is in an assembled configuration. The upper surface of the cover 126 includes a receiving surface 125. The receiving surface 125 defines an opening 123. The cover 126 defines an interior (not shown) which is configured to receive the reservoir 140 such that the outlet 144 of the reservoir 140 is aligned with the opening 123 of the receiving surface 125.

The cap 150 defines an opening 152. The cap 150 is configured to engage with the receiving portion 125 of the intermediate portion 120 such that the opening 152 of the cap is aligned with the opening 123 of the receiving surface 125. The receiving surface 125 and the cap 150 may define a number of complementary mating features. For example, the receiving surface 125 may include a number of circular or partially circular (e.g., semi-circular) grooves configured to mate with a number of circular or partially circular (e.g., semi-circular) ridges formed in the bottom surface of the cap 150. In some variations, the cap 150 may function as a bearing surface on which an inner feature or portion of the upper housing 130 rotates (e.g., when transitioning between the unlocked and locked configurations).

The upper housing 130 may be configured to be coupled to the intermediate portion 120 via any suitable coupling feature. For example, the upper housing 130 and the intermediate portion 120 may each include corresponding coupling features such that the upper housing 130 may be rotationally coupled to the intermediate portion 120. As shown in FIG. 7, the intermediate portion 120 may include at least one groove 127 configured to receive mating tabs 128 (shown in FIGS. 10-12) of the upper housing 130. The intermediate portion 120 may be configured to be coupled to the container 110 via any suitable coupling feature. For example, the intermediate portion 120 and the container 110 may each include corresponding mating threads such that the intermediate portion 120 may be screwed into engagement with the container 110.

When the system 100 is in an assembled and unlocked configuration, the outlet 144 of the reservoir 140 may align with the opening 123 of the cover 126, the opening 152 of the cap 150, and the opening 134 of the upper housing 130 such that liquid may flow from the reservoir 140, through the opening 123, through the opening 152, through the opening 134, and from the spout 136. For example, the outlet 144, the opening 123, the opening 152, and the opening 134 may be coaxial in at least one configuration of the system (e.g., the unlocked configuration). The opening 134 may be off-center or offset from a longitudinal axis of the upper housing 130, such that the opening 145 may be toggled between alignment and misalignment with one or more other openings in fluidic communication with the contents of the container 110, via rotation, translation, and/or other movement. For example, the system 100 may be transitioned from the unlocked configuration to the locked configuration via rotating the upper housing 130 relative to the intermediate portion 120 such that the opening 134 of the upper housing 130 is rotated out of alignment with the opening 152 of the cap 150. In the locked configuration, the opening 134 may instead be aligned with, or blocked by, a portion of the upper surface of the cap 150. In some variations, the system 100 may further include one or more detents, such as at least one detent corresponding to the unlocked configuration and/or at least one detent corresponding to the locked configuration. Such detents may, for example, enable the upper housing 130 to "click" or otherwise provide tactile feedback confirming the unlocked or locked configuration. One or more detents may be formed via mating features an interface between the upper housing 130 with the intermediate portion 120 and/or the cap 150, for example.

Figure 10:
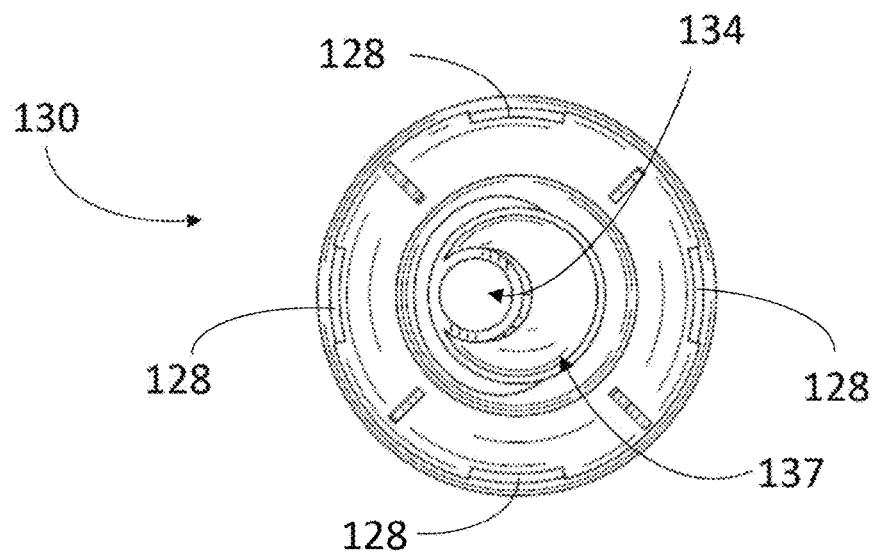
FIG. 10 is a bottom view of an upper housing of the system of FIG. 1.
Figures 11, 12:
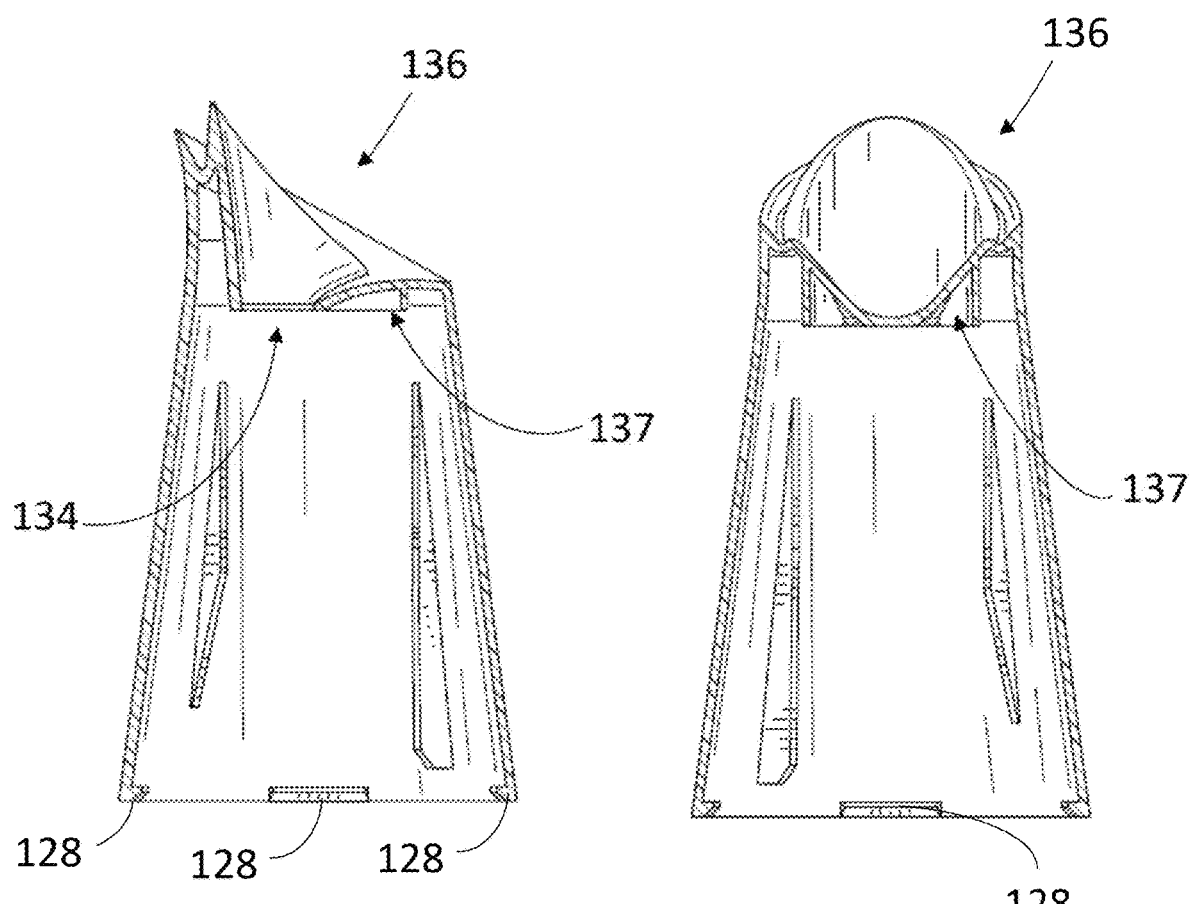
FIG. 11 is a cross-sectional view taken along a first cross-section of the upper housing of FIG. 10.
FIG. 12 is a cross-sectional view taken along a second cross-section of the upper housing of FIG. 10.

Furthermore, as shown, for example, in FIGS. 10-12, the upper housing 130 may include an interior region 137 defined by an internal wall such that any liquid that may flow through the opening 152 when the assembly 100 is in the locked configuration may be contained within the interior region 137. Accordingly, the unlocked configuration may function as an "open" configuration enabling dispensing of the container contents out the opening 134, and the locked configuration may function as a "closed" configuration substantially preventing dispensing of the container contents out the opening 134. For example, the locked or "closed" configuration may be used when storing or transporting the system 100.

As shown in FIG. 7, the handle 124 may include an inner handle portion 124A and an outer handle portion 124B. The outer handle portion 124B may be coupled to the annular ring 121 of the intermediate portion 120 via any suitable coupling method or mechanism. For example, the outer handle portion 124B may be formed monolithically with the annular ring 121. The inner handle portion 124A may be coupled to the outer handle portion 124B via any suitable coupling method or mechanism. For example, in some embodiments, the inner handle portion 124A may be overmolded over the outer handle portion 124B. The inner handle portion 124A may be made of a different material than the outer handle portion 124B. For example, the inner handle portion 124A may include silicone or other suitable material, while the outer handle portion 124B may be made of a suitable rigid or semi-rigid plastic. The handle 124 may include frictional features to improve grip and reduce the risk of a user dropping the system when handling the system. For example, the handle 124 may include ridges, bumps, or other raised features. Additionally or alternatively, the handle 124 (e.g., inner handle portion 124A) may include a highly frictional material such as silicone.

FIGS. 8 and 9 are a perspective view and a side view of the container 110, respectively. As shown, the container 110 may have a tapered outer profile. For example, the container 110 may have a generally frustoconical shape. Additionally, the container 110 may include at least one thread 112 configured to mate with a corresponding thread or threads of the intermediate portion 120. The container 110 defines an opening 114 through which liquid may flow into and out of the container 110. One or more sealing mechanisms, such as an O-ring or gasket, may be included at the interface between the container 110 and the intermediate portion 120 to help reduce risk of fluid leak. In some variations, the container 110 may be made of a rigid or semi-rigid material such as a rigid polymer (e.g., acrylic) or glass, and may be formed through injection molding, turning, or any suitable manufacturing process. The container 110 may be translucent or transparent, which may, for example, enable a user to view and monitor the volume of liquid in the container 110. Furthermore, in some variations the container 110 may include one or more liquid volume indicator markings and/or text (e.g., "MAX") that may be indicate to a user the extent to which the container can be filled (e.g., to ensure proper self-dosing operation of the reservoir, to avoid spillage, etc.). Additional graduated markings in the container may indicate additional discrete volume measurements. Such indicator markings may, for example, be etched or embossed in the surface of the container 110, or may be part of a label or decal that is affixed to the container 110. In some variations, a bottom surface of the container 110 may include a relatively frictional surface to increase stability of the container 110 on a storage surface. For example, a bottom surface of the container 110 may include silicone or another suitable frictional material.

FIGS. 10-12 are various views of the upper housing 130. Specifically, FIG. 10 is a bottom view of the upper housing 130. FIG. 11 is a cross-sectional view taken along a first cross-section of the upper housing 130. FIG. 12 is a cross-sectional view taken along a second cross-section of the upper housing 130, the second cross-section being perpendicular to the first cross-section. As shown in FIGS. 10-12, the upper housing 130 includes four mating tabs 128. The mating tabs 128 project toward a central axis of the upper housing 130 and are configured to be received by the groove 127 of the intermediate portion 120 such that the upper housing 130 may be rotated relative to the intermediate portion 120. In some variations, one of more of the mating tabs 128 may, for example, form part of a detent mechanism as described above.

Figure 13:
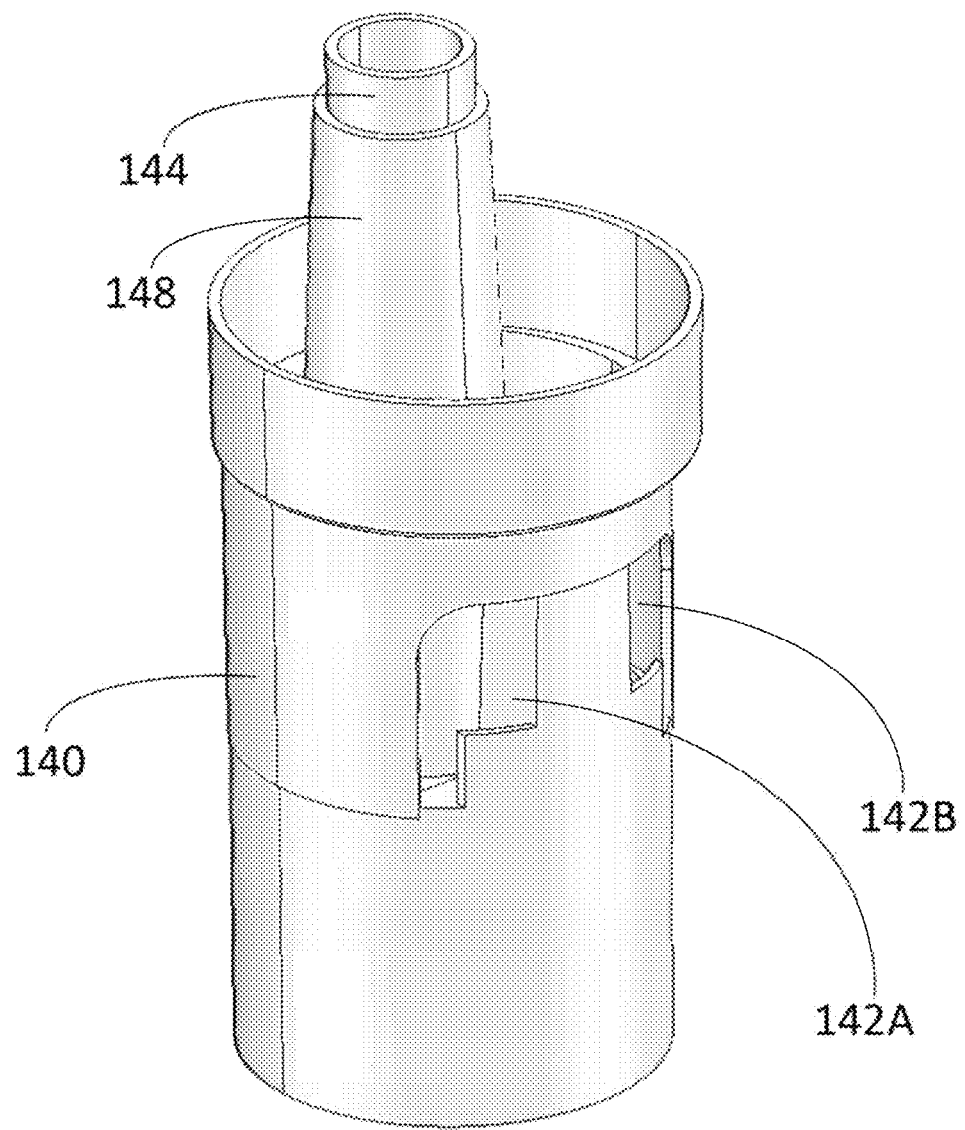
FIG. 13 is a perspective view of a side of the reservoir shown in FIG. 7.

FIGS. 13 and 14 are perspective views of a side and a top of the reservoir 140, respectively. FIG. 15 is a side view of the reservoir 140, with some interior portions of the reservoir 140 shown with dashed lines. As described above, the reservoir 140 includes a first inlet 142A, a second inlet 142B, and tubular member 148 defining an outlet 144. The reservoir 140 may include a flange 149 disposed proximate the first inlet 142A and the second inlet 142B. In other variations, the reservoir 140 may include fewer (one) or more (three or more) separate inlets. The first and second inlets of the reservoir 140 may be sized and shaped to allow a sufficient volume of liquid to flow into the reservoir when the reservoir is assembled into the system and tipped (e.g., in a pouring maneuver). Furthermore, the inlets of the reservoir may be angularly distributed around the side wall of the reservoir 140, so as to allow liquid to flow into the reservoir from multiple angles. For example, generally, the inlets may be arranged in a row and collectively span an angle range of up to about 180 degrees or less. For example, as shown in FIG. 13, the inlets 142A and 142B may collectively span an angle of about 90 degrees so as to generally form a window of a 90 degree arc length (aside from the non-open distance between adjacent inlets), thereby allowing some liquid to enter the reservoir along about a 45 degree arc length window on one side of the handle, and allowing some liquid to enter the reservoir along about a 45 degrees arc length window on the other side of the handle. The inlets may collectively span other windows (e.g., 120 degrees, 60 degrees, 30 degrees, etc.) so as to allow flow of liquid into the reservoir from a wider or narrow variety of tilting angles.

As may be seen in FIG. 15, the reservoir 140 has a reservoir bottom 146. The tubular member 148 extends away from the reservoir bottom 146 such that the outlet 144 of the tubular member 148 is defined at the end of the tubular member 148 farther away from the reservoir bottom 146 than the end of the tubular member 148 closer to the reservoir bottom 146. In some variations, the reservoir 140 may include one or more features that help direct flow of liquid toward the reservoir bottom when the reservoir 140 is upright as shown in FIG. 15, and/or help direct flow of liquid toward the tubular member 148 when the reservoir 140 is angled (e.g., for pouring the liquid out of the reservoir). For example, the tubular member 148 may include at least a partial flange 147 disposed proximate the first inlet 142A and the second inlet 142B of the reservoir 140. The partial flange 147 is sloped toward the reservoir bottom such that when the reservoir is upright, the partial flange 147 directs liquid entering the inlet 142A and/or inlet 142B toward the reservoir bottom. When the reservoir is angled (e.g., inverted, or rotated to an angle between the upright orientation and an inverted orientation), the partial flange 147 helps block or resist reverse liquid flow (e.g., toward upper volume 145 shown in FIG. 20), and instead help direct liquid toward the tubular member 148 (e.g., similar to a funnel).

Figure 16:
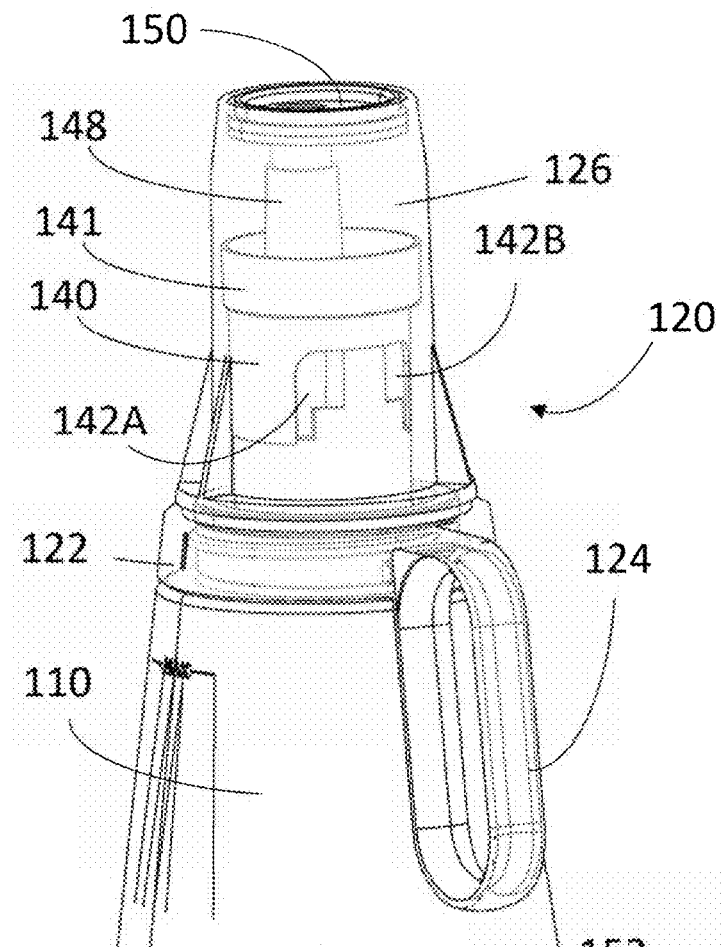
FIG. 16 is a perspective view of a portion of the system of FIG. 1.
Figure 17:
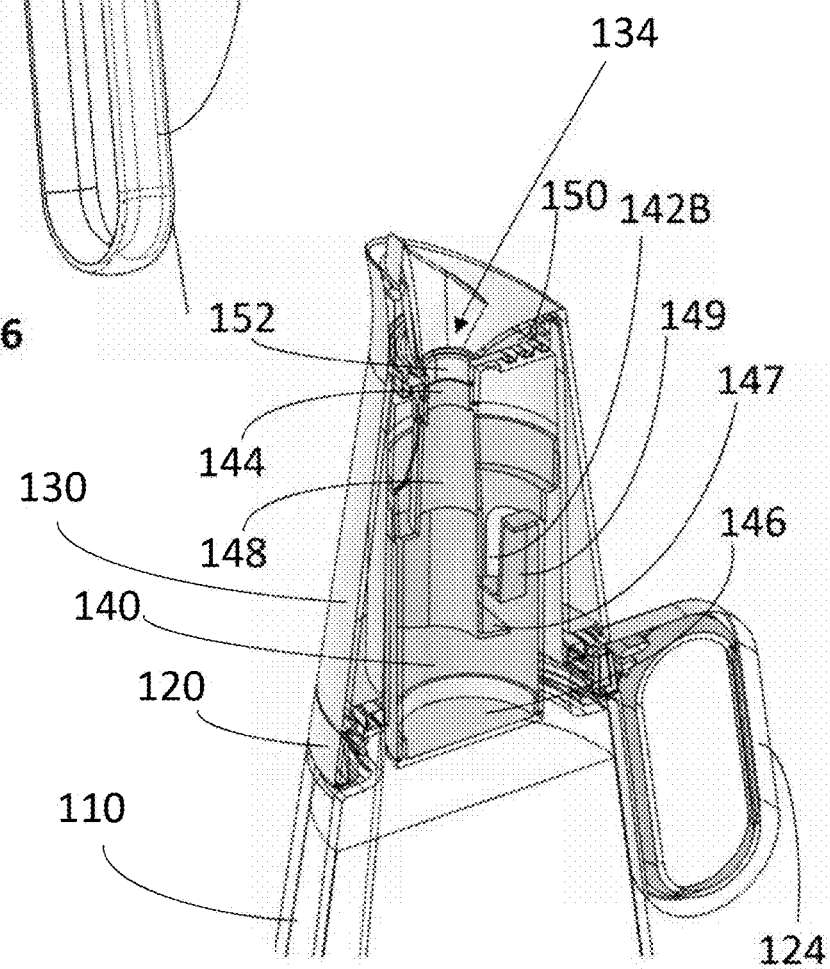
FIG. 17 are a perspective view of a cross-section of a portion of the system of FIG. 1.

FIGS. 16 and 17 are a perspective view of a portion of the system 100 and a perspective view of a cross-section of a portion of the system 100, respectively. FIG. 16 shows a portion of the container 110 coupled to the intermediate portion 120. The intermediate portion 120 is shown as being transparent such that the reservoir 140 and the cap 150 may be seen through the intermediate portion 120. As shown in FIGS. 16 and 17, in some variations, the first inlet 142A and/or the second inlet 142B may be disposed on an opposite side of a midplane of the reservoir 140 from the outlet 144, such that when the system is tilted toward the side on which the outlet 144 is located, liquid in the reservoir tends to flow toward the outlet and away from the inlets 142 and 142B.

Figure 18:
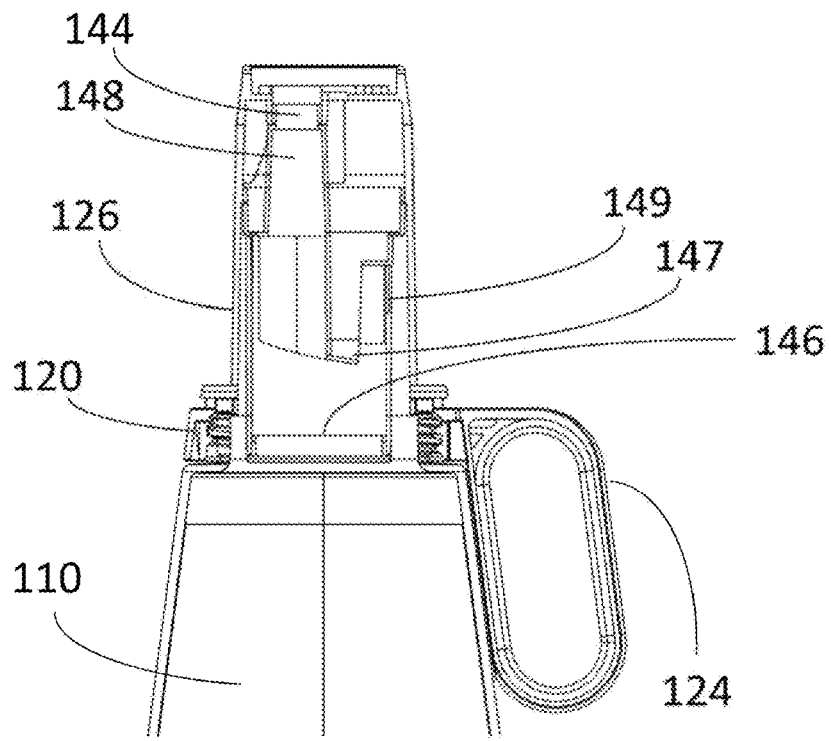
FIG. 18 is a cross-sectional view of a portion of the system of FIG. 1 without the upper housing or the cap.
Figure 19:
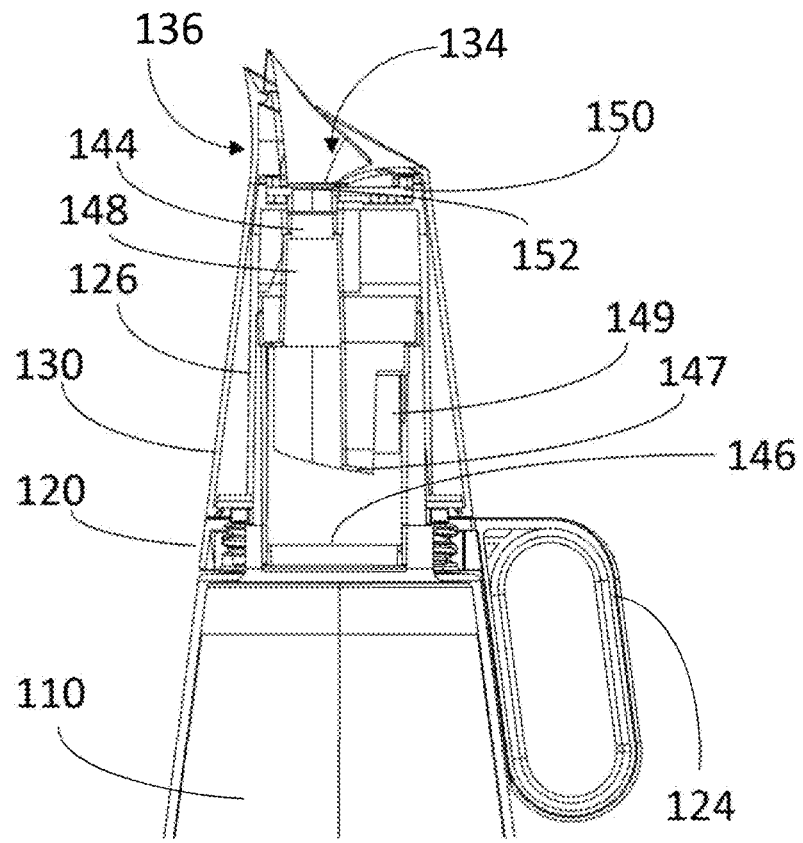
FIG. 19 is a cross-sectional view of a portion of the system of FIG. 1 in the assembled, unlocked configuration.

FIG. 18 is a cross-sectional view of a portion of the system 100 without the upper housing 130 or the cap 150 when the system 100 is in the assembled, unlocked configuration. FIG. 19 is a cross-sectional view of a portion of the system 100 in the assembled, unlocked configuration.

Figure 20:
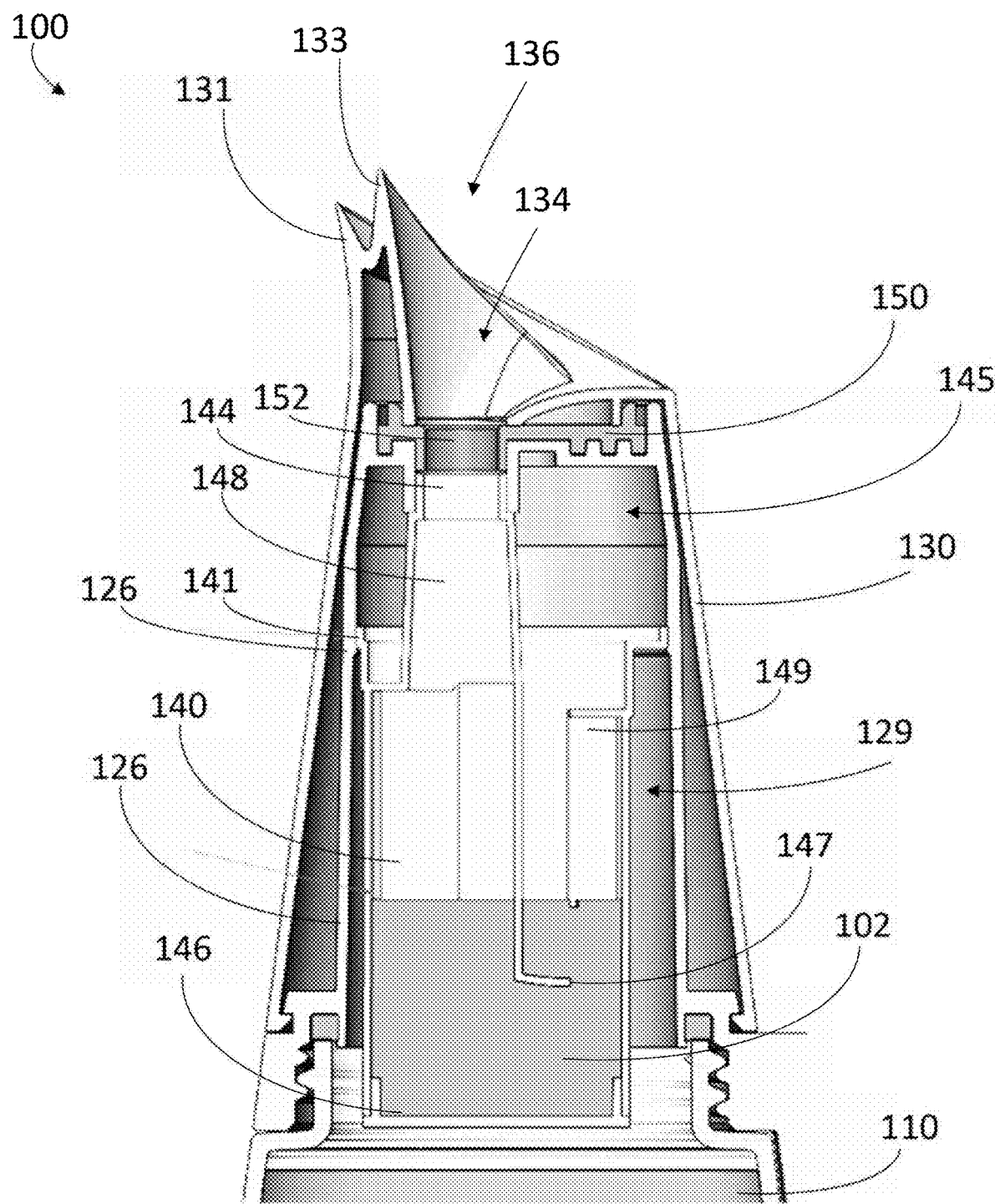
FIG. 20 is a cross-sectional illustration of a portion of the system of FIG. 1 in an assembled, unlocked configuration and containing a predetermined quantity of liquid in the reservoir.

FIG. 20 is a cross-sectional illustration of a portion of the system 100 in an assembled, unlocked configuration and containing a predetermined quantity of liquid in the reservoir 140. As shown in FIG. 20, in the assembled and unlocked configuration, the outlet 144 of the reservoir 140 is aligned with the opening 123 of the cover 126, the opening 152 of the cap 150, and the opening 134 of the upper housing 130. The reservoir 140 may be mounted within an interior of the cover 126 via any suitable coupling mechanism. For example, the reservoir 140 may include a flange 141 and the cover 126 may include a projection 126A which extends from an inner surface of the cover 126 into the interior of the cover 126. The flange 141 of the reservoir 140 may be configured to mate with the projection 126A such that the reservoir 140 is retained within the cover 126.

The reservoir 140 may be mounted or received within the cover 126 such that a generally annular space 129 is defined between the outer surface of the reservoir 140 and the inner surface of the cover 126 below the flange 141 of the reservoir 140. The reservoir 140 may be in fluidic communication with the container 110 via the annular space 129 and the first inlet 142A and/or the second inlet 142B (shown, for example, in FIGS. 13, 14, and 17). The opening 134 may be arranged off-center relative to a central axis of the reservoir 140. As shown in FIG. 20, the inner surface of the cover 126 above the reservoir 140 may define an upper volume 145. In some variations, the reservoir 140 may be made of a rigid or semi-rigid material such as a rigid plastic that is formed, for example, through injection molding, milling, or any suitable process.

Although the reservoir 140 is primarily described herein as being in fluidic communication with the container 110 via an annular space with the cover 126 of the intermediate portion, it should be understood that the reservoir 140 may be additionally or alternatively be in fluidic communication with the container 110 through any suitable fluid passageway. For example, in some variations, the intermediate portion 120 may be omitted such that the reservoir 140 receives fluid from the container 110 via a space formed between the reservoir and the upper housing 130. In yet other variations, suitable channels, tubing, or the like may transport liquid into the reservoir 140.

Filling the reservoir 140 with a predetermined quantity of liquid may be performed by rotating the system 100 through at least a threshold angle of rotation. For example, the reservoir 140 may be mounted to the container 110 via the intermediate portion 120 as described above, and the container 110 may contain sufficient liquid for filling the reservoir 140 (e.g., the container 110 may contain a quantity of liquid equal to or greater than a predetermined quantity of liquid configured to be held by the reservoir 140 in an upright orientation). In this configuration, the reservoir 140 may be filled with a predetermined quantity of liquid by transitioning the system 100 from a substantially upright orientation in which the inlet 144 of the reservoir 140 is above the container 110 (e.g., the bottom of the container 110 is disposed on a surface), to a rotated orientation in which the reservoir 140 is angled relative to the upright orientation by at least a threshold angle of rotation. In some variations, the threshold angle of rotation may be between about 90 degrees and about 180 degrees (e.g., about 90 degrees, about 110 degrees, about 130 degrees, about 150 degrees, about 170 degrees, etc.). In some variations, the threshold angle of rotation may be about 180 degrees (e.g., such that the reservoir 140 is inverted) When the system 100 is rotated to the rotated orientation, liquid may flow from the container 110, through the annular space 129, through the first inlet 142A and/or the second inlet 142B, through the reservoir 140, and into the upper volume 145. In some embodiments, the liquid may fill the upper volume 145 and a portion of the reservoir 140 outside of the tubular member 148 when the system is in the rotated orientation.

After the upper volume 145 is filled with at least some liquid, the system 100 may be transitioned from the rotated orientation to the upright orientation, causing the liquid in the upper volume 145 to flow toward the bottom surface 146 of the reservoir 140. The reservoir 140 may be configured to hold a predetermined quantity of liquid. The predetermined quantity of liquid may be defined, at least in part, by the location of the first inlet 142A and/or the second inlet 142B relative to the reservoir bottom 146. The location of the portion of the first inlet 142A and/or the second inlet 142B closest to the reservoir bottom 146 may determine the liquid level of the liquid within the reservoir 140. For example, when the system 100 is in an upright orientation, any liquid within the reservoir 140 which rises above the lowest portion of the first inlet 142A and/or the second inlet 142B may flow out of the first inlet 142A and/or the second inlet 142B, through the annular space 129, and into the container 110. Thus, a predetermined quantity of liquid may be defined, at least in part, by the location of the first inlet 142A and/or the second inlet 142B relative to the reservoir bottom 146. Thus, when the system 100 is transitioned from the rotated orientation to the upright orientation, a predetermined quantity of liquid from the upper reservoir 145 may flow into the reservoir 140, and any quantity of liquid beyond the predetermined quantity of liquid that was in the upper reservoir 145 may flow out of the first inlet 142A and/or the second inlet 142B, through the annular space 129, and back into the container 110. The predetermined quantity of liquid (e.g., shown as 102 in FIG. 20) will remain in the reservoir 140, thereby allowing the reservoir to "self-dose" or measure out the predetermined quantity of liquid with the simple movement of tilting the system 100 to a threshold angle and restoring the system 100 to an upright orientation.

To dispense (e.g., pour) the predetermined quantity of liquid 102 from the reservoir 140, the system 100 may be rotated to a rotated orientation in which the reservoir 140 (and the system 100) is angled relative to the upright orientation. The rotated orientation may be the same or different from the rotated orientation the system 100 was transitioned to during the filling stage. Under the force of gravity, once the reservoir 140 is in the angled orientation, the predetermined quantity of liquid may flow from the reservoir 140, through the tubular member 148, through the outlet 144, through the opening 152, and through the opening 134 of the spout 136. Simultaneously, a refilling quantity of liquid within the container 110 may flow under force of gravity through the annular space 129, through the first inlet 142A and/or the second inlet 142B, through the reservoir 140, and into the upper volume 145 (which is positioned below at least a portion of the reservoir 140 when the system 100 is in the rotated orientation).

When the predetermined quantity of liquid has been dispensed from the reservoir 140 through the spout 136, the system 100 may then be transitioned back to the upright orientation such that the refilling quantity of liquid within the upper reservoir 145 may flow toward the reservoir bottom 146. Any quantity of liquid beyond the predetermined quantity of liquid may flow out of the first inlet 142A and/or the second inlet 142B, through the annular space 129, and back into the container 110 such that the predetermined quantity of liquid remains in the reservoir 140. The flange 149 may be shaped such that liquid flowing through the first inlet 142A and the second inlet 142B is prevented from unintentionally flowing toward the reservoir bottom 146 while liquid is being dispensed from the reservoir 140 via the spout 136 and liquid is refilling the upper reservoir 145.

After the reservoir is filled once as described above, every time a predetermined quantity of liquid is dispensed from the reservoir 140 through the spout 136, a refilling quantity of liquid is simultaneously received into the upper reservoir 145. Upon return of the system 100 to an upright position, the refilling quantity of liquid flows into and/or through the reservoir 140 such that another volume of the predetermined quantity of liquid remains in the reservoir 140. Thus, after an initial filling of the reservoir 140 (which "primes" the reservoir for subsequent simultaneous dispensing and refilling for subsequent rotations of the system), a single cycle of pouring liquid and returning the system 100 to an upright orientation may accomplish both dispensing and refilling of liquid in the reservoir to another volume of the predetermined quantity of liquid in the reservoir 140. After one cycle of rotating the system and restoring the system to an upright orientation, the system 100 is thereby prepared for the next dispensing step. Accordingly, every cycle of such actions conveniently provides both a dispensing and an automatic "self-dosing" of the predetermined quantity of liquid.

In some embodiments, the container 110 may be decoupled from the intermediate portion 120. For example, once emptied, the container 110 may be refilled and recoupled to the intermediate portion 120 such that the dispensing and refilling steps may continue as described above.

Figure 21:
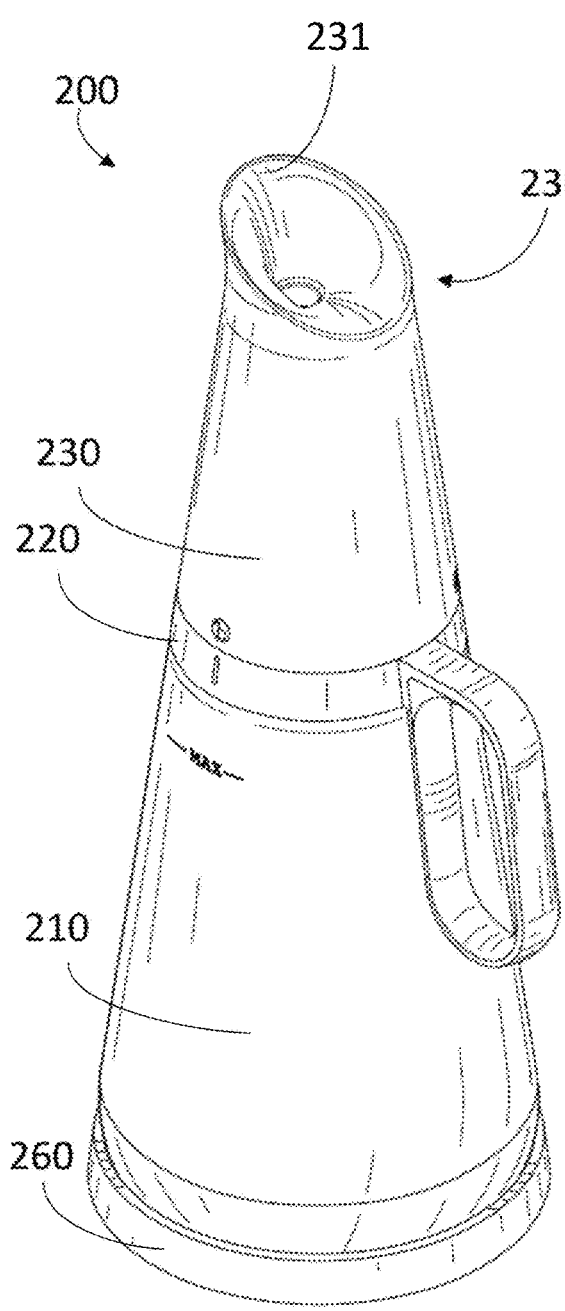
FIGS. 21 and 22 are a perspective view and a front view, respectively, of a system, according to an embodiment.
Figure 22:
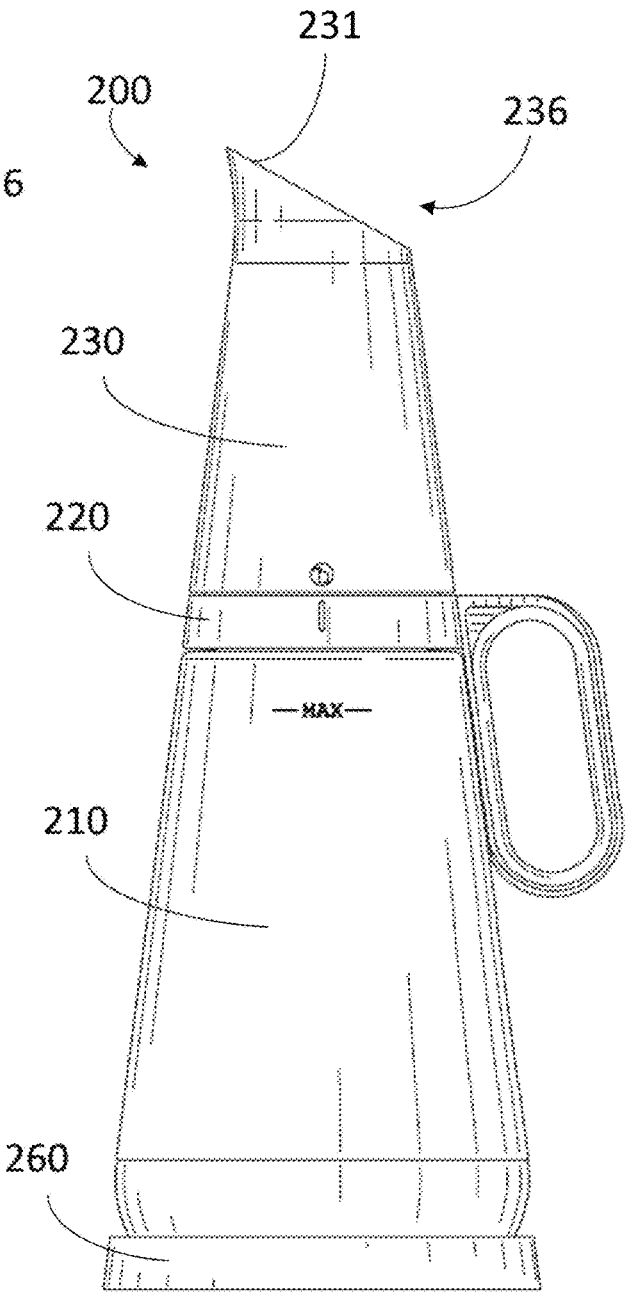

In some embodiments, a system may include a base. For example, FIGS. 21 and 22 are a perspective view and a front view, respectively, of a system 200 having a base 260 (e.g., a base plate). The base may be coupled to the container 210 (e.g., integrally formed, joined with mating features or suitable fasteners, etc.) or may be separate from the container 210 to provide a resting surface for the container 210 when the container 210 is not in use. The system 200 may be the same or similar in structure and/or function to any of the systems described herein, such as the system 100. For example, the system 200 may include a container 210, a reservoir (not shown), an intermediate portion 220, and an upper housing 230 including a spout 236. The system 200 may include a base 260. The base 260 may be configured to receive a bottom portion of the container 210 such that the system 200 may be stably disposed on a surface. The base 260 may be circular to correspond to a circular bottom of a container 210, or may be any suitable shape (e.g., oval, square, etc.). In some variations, the base 260 may include one or more frictional features on an upper surface (in contact with the container 210) and/or a lower surface. For example, the base 260 may include one or more raised ridges and/or rubberized or other relatively high friction features on an upper surface of the base 260. Additionally or alternatively, the base 260 may include bottom projections (e.g., feet) that include one or more frictional features, such as to reduce slippage on a shelf, counter, or other surface.

Furthermore, as shown in FIG. 21, in some variations, the spout 236 may include a single lip 231. The single lip 231 may include a linearly or arcuately sloping surface configured to guide liquid exiting the opening of the upper housing 230 when the system 200 is rotated, and/or guide residual liquid back into the reservoir when the system 200 is upright.

Figure 23:
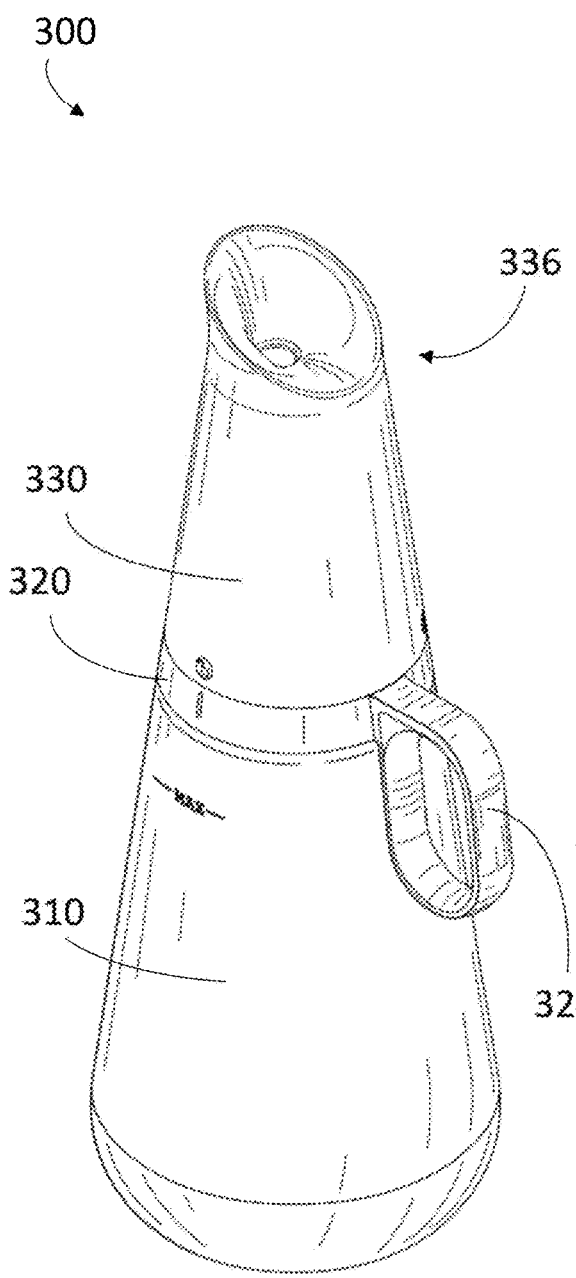
FIGS. 23 and 24 are a perspective view and a front view, respectively, of a system, according to an embodiment.
Figure 24:
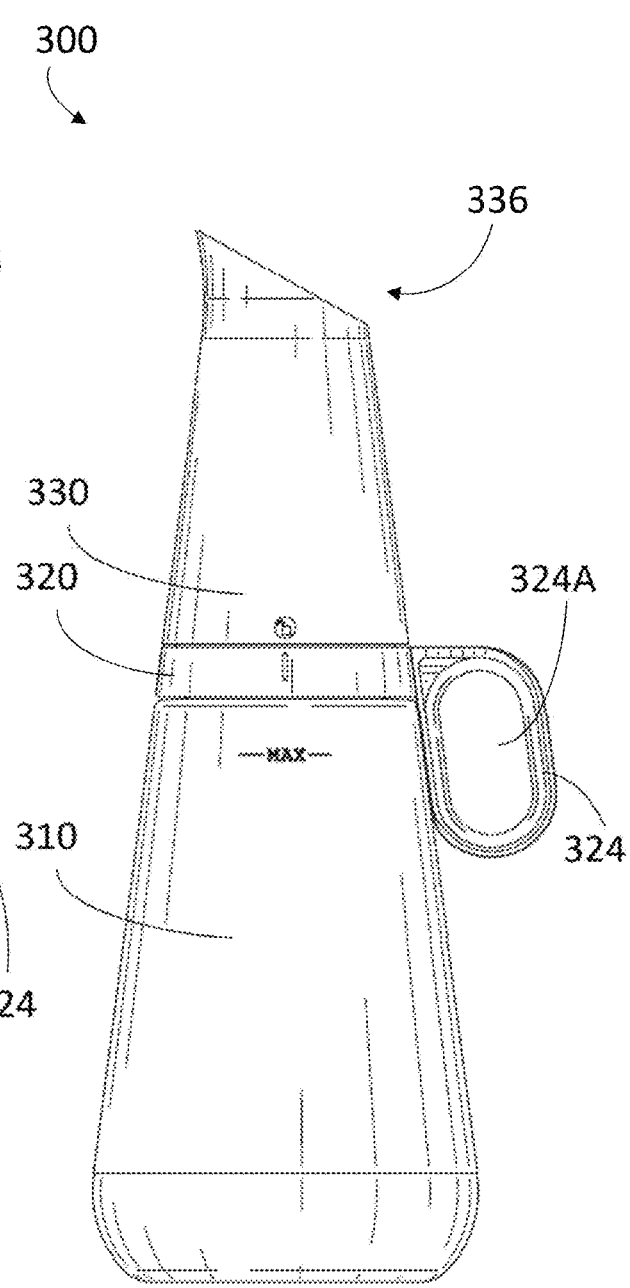

In some embodiments, a system may include a handle having any suitable size and/or shape. For example, FIGS. 23 and 24 are a perspective view and a front view, respectively, of a system 300. The system 300 may be the same or similar in structure and/or function to any of the systems described herein, such as the system 100. For example, the system 300 may include a container 310, a reservoir (not shown), an intermediate portion 320, and an upper housing 330 including a spout 336. As shown, the intermediate portion 320 may include a handle 324 that is shorter in length than, for example, the handle 124. The handle 324 may define an opening 324A that is configured to receive, for example, only two fingers of a user's hand, while the handle 124 may define an opening that is configured to receive, for example, three or more fingers of a user's hand.

In some embodiments, rather than a handle defining an opening, the handle may be formed as an elongated member configured to be gripped by a user. For example, FIGS. 25 and 26 are a perspective view and a front view, respectively, of a system 400. The system 400 may be the same or similar in structure and/or function to any of the systems described herein, such as the system 100. For example, the system 400 may include a container 410, an intermediate portion 420, and an upper housing 430 including a spout 436. As shown, the intermediate portion 420 may include a handle 424 that includes an elongated member coupled to an annular portion 421 of the intermediate portion 420 via a connecting portion 424B. The handle 424 may be gripped by the user via, for example, wrapping the user's fingers around the elongated member.

Figure 27:
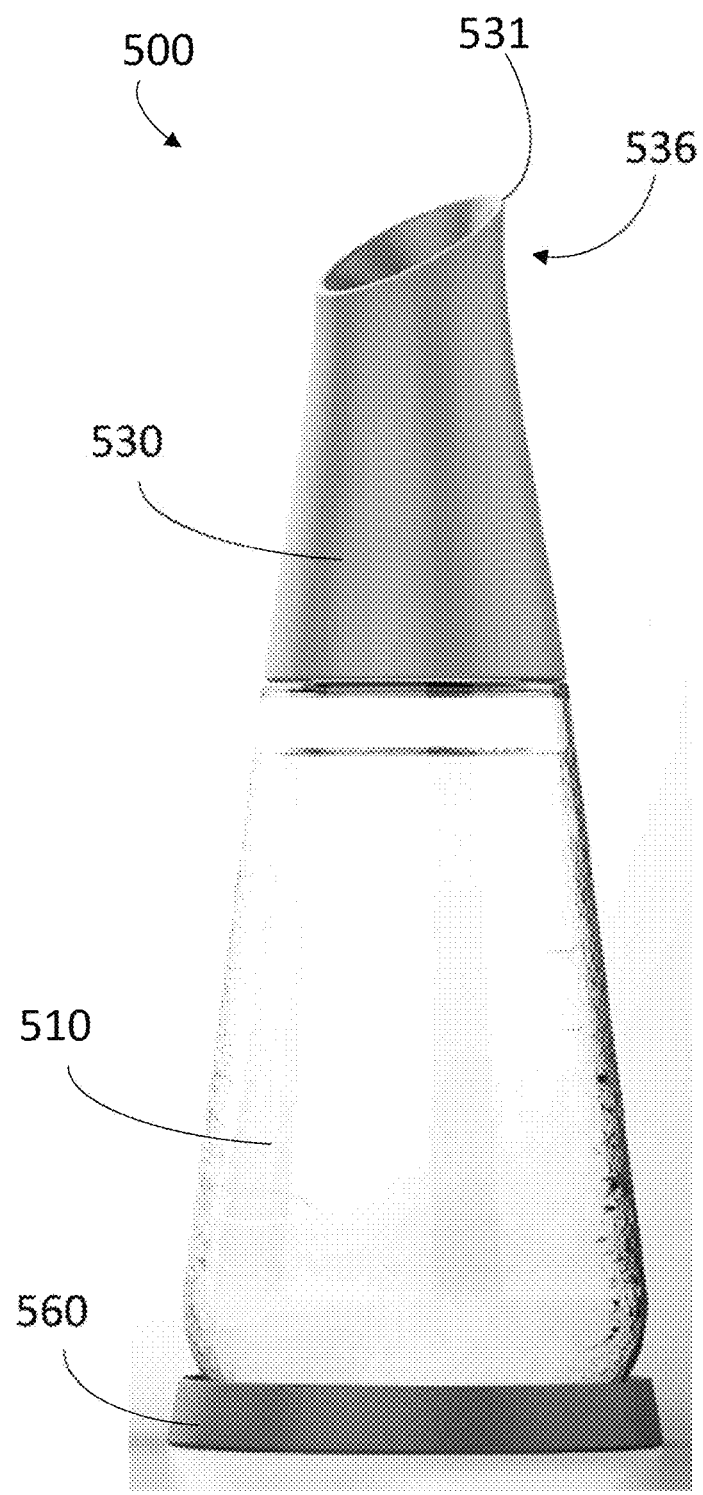
FIGS. 27-29 are a front view, a top view, and a side cross-sectional view, respectively, of a system, according to an embodiment.
Figure 28:
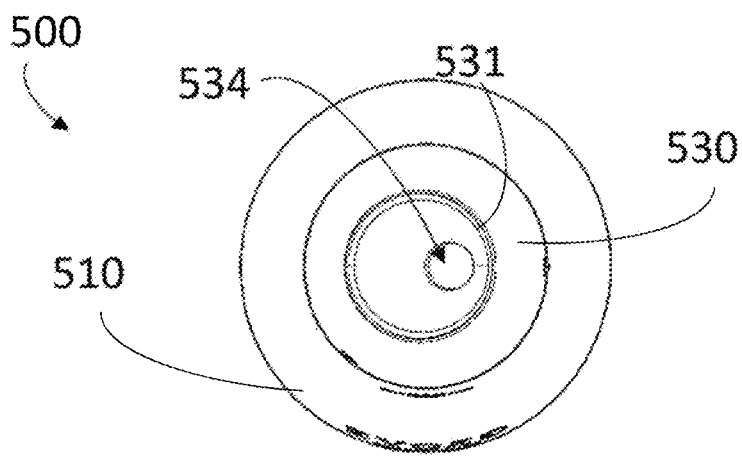
Figure 29:
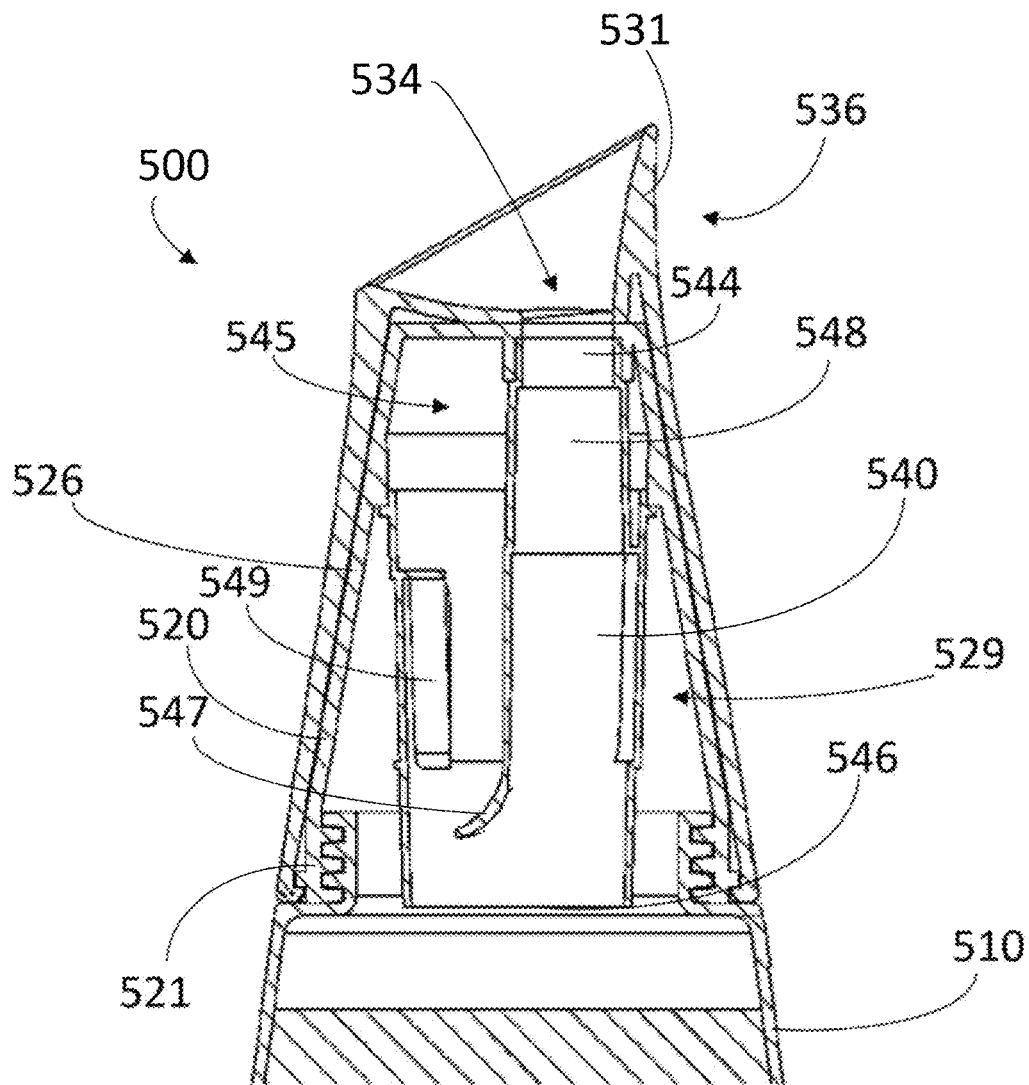

In some embodiments, the system may omit a distinct handle. For example, FIGS. 27-29 are a front view, a top view, and a cross-sectional view, respectively, of a system 500 without a distinct handle, such that the body of the container 510 and/or an upper hosing 530 may be grasped by a user directly. The system 500 may be the same or similar in structure and/or function to any of the systems described herein, such as the system 100. For example, the system 500 may include a container 510, a reservoir (not shown), an intermediate portion 520 including a cover 526, and an upper housing 530 including a spout 536. The upper housing 530 may be formed of or include a cover of a flexible and/or frictional material, such as silicone. The system 500 may further include a base 560. The base 560 may be configured to receive a bottom portion of the container 510 such that the system 500 may be stably disposed on a surface. The base 560 may be formed of, for example, silicone. The base 560 may, in some variations, be similar to base 260 described above. Furthermore, as shown in FIGS. 27-29, the spout 536 may include a single lip 531 similar to single lip 231 described above.

Additionally, as shown, for example, in FIG. 29, the system 500 may include a reservoir 540 that may be the same or similar in structure and/or function to any of the reservoirs described herein. For example, the reservoir 540 may include a tubular portion 548 defining an outlet 544 opposite a reservoir bottom 546. Furthermore, the reservoir 540 may include a flange 549 disposed proximate a first inlet and a second inlet (not shown) to the reservoir 540. The tubular member 548 also includes at least a partial flange 547 disposed proximate the first inlet and the second inlet of the reservoir 540. As shown, the partial flange 547 may extend away from a central axis of the tubular member 548 to an interior surface of the reservoir 540 such that liquid flow within the reservoir 540 is directed around the partial flange 547. Additionally, the cover 526 may define an upper reservoir 545 that may function similarly to the upper reservoir 145 described above.

Rather than the intermediate portion 520 including an annular ring 521 forming a portion of the external surface of the system 500, the annular ring 521 of the intermediate portion 520 may be covered by the upper housing 530. Furthermore, rather than including a cap between the upper housing 530 and the upper surface of the intermediate portion 520, the upper surface of the intermediate portion 520 may be directly coupled to the upper housing 530.

In some embodiments, the upper housing 530 may be rotatable relative to the intermediate portion 520 (and thus the cover 526) such that the upper housing 530 may be rotated between an unlocked configuration in which the opening 534 is aligned with the outlet 544 of the reservoir 540 and a locked configuration in which the opening 534 is not aligned with the outlet 544 of the reservoir 540, preventing liquid from flowing from the spout 536. In some embodiments, the upper housing 530 is not rotatable relative to the intermediate portion 520 such that the opening 534 is always aligned with the outlet 544 of the reservoir 540.

Other exemplary handle shapes are shown in FIGS. 30-32. For example, as shown in FIG. 30, the system may include a slim loop-shaped handle. As shown in FIG. 31, the system may include an elongated handle member 724, with an angled ergonomic portion. As shown in FIG. 32, the system may include a handle comprising a downward-curving member. The systems shown in FIGS. 30-32 may be the same or similar in structure and/or function to any of the systems described herein.

For example, FIG. 33 is a front view of a system 900, which may be the same or similar in structure and/or function to any of the systems described herein. The system 900 includes an elongated and curved handle 924 coupled to an upper housing of the system 900 near the spout of the system 900.

FIG. 34 is a front view of a system 1000, which may be the same or similar in structure and/or function to any of the systems described herein. The system 1000 includes a loop-shaped handle 1024 coupled to an upper housing of the system 1000 near the bottom of the upper housing of the system 1000.

FIG. 35 is a front view of a system 1100, which may be the same or similar in structure and/or function to any of the systems described herein. The system 1100 includes a semi-circular handle 1124 coupled to an upper housing of the system 1100. The semi-circular handle 1124 and the upper housing collectively define an open interior of the semi-circular handle 1124. In other variations, the handle may include a loop of any suitable shape (e.g., rectangular, square, other arc lengths of a circle, etc.) that is joined at both ends to the upper housing of the system.

FIG. 36 is a front view of a system 1200, which may be the same or similar in structure and/or function to any of the systems described herein. The system 1200 includes a semi-circular disc handle 1224 coupled to an upper housing of the system 1200. The disc handle 1224 may include a raised outer edge (e.g., to improve graspability and/or ergonomics of the handle). In other variations, the handle may include a disc of any suitable shape (e.g., rectangular, square, other arc lengths of a circle, etc.) that is joined to the upper housing of the system 1200.

Figure 37:
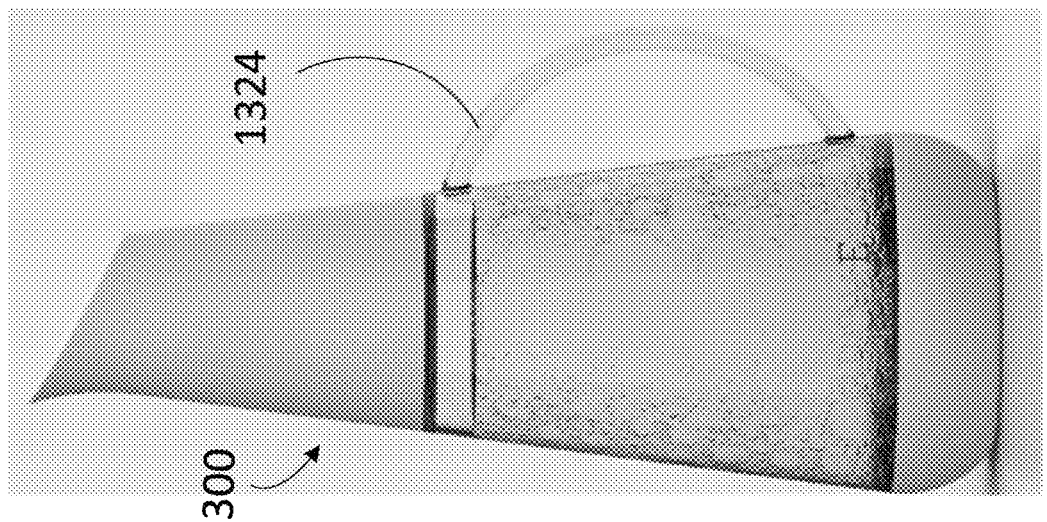
FIG. 37 is a front view of a system having a handle, according to an embodiment.

FIG. 37 is a front view of a system 1300, which may be the same or similar in structure and/or function to any of the systems described herein. The system 1300 includes a semi-circular handle 1324 having a first end coupled to the container of the system 1300 near the top of the container and a second end coupled to the container near a middle portion of the container. In other variations, the handle may include a loop of any suitable shape (e.g., rectangular, square, other arc lengths of a circle, etc.) that is joined at both ends to the container.

Figure 38:
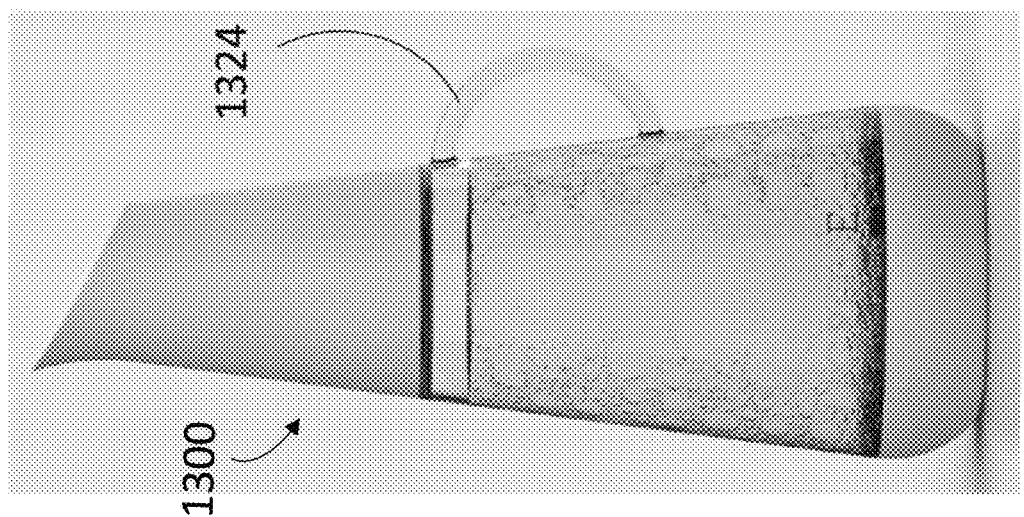
FIG. 38 is a front view of a system having a handle, according to an embodiment.

FIG. 38 is a front view of a system 1400, which may be the same or similar in structure and/or function to any of the systems described herein. The system 1400 includes a semi-circular handle 1424 having a first end coupled to the container of the system 1400 near the top of the container and a second end coupled to the container near a bottom portion of the container. In other variations, the handle may include a loop of any suitable shape (e.g., rectangular, square, other arc lengths of a circle, etc.) that has ends joined at the top and bottom portions of the container.

Non-limiting examples of various aspects and variations of the invention are described herein and illustrated in the accompanying drawings.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to explain the principles of the invention and its practical applications, they thereby enable others skilled in the art to utilize the invention and various embodiments with various modifications as are suited to the particular use contemplated. It is intended that the following claims and their equivalents define the scope of the invention.

The invention claimed is:

1. A system comprising:
a reservoir mountable to a container holding a liquid and comprising an inlet and an outlet, wherein the reservoir is configured to measure a first quantity of the liquid while in a first orientation, and is configured to simultaneously dispense the first quantity of the liquid from the outlet and receive a second quantity of the liquid through the inlet while in a second orientation that is angled relative to the first orientation above a threshold angle; and
a housing arranged over the reservoir and comprising a spout opening,
wherein the system is transitionable between an open configuration in which the spout opening is in fluidic communication with the reservoir and a closed configuration in which the spout opening is blocked from fluidic communication with the reservoir.

2. The system of claim 1, wherein the housing is movable to transition the system between the open configuration and the closed configuration.

3. The system of claim 2, wherein the housing is rotatable relative to the reservoir around a longitudinal axis to transition the system between the open configuration and the closed configuration.

4. The system of claim 1, wherein the system comprises at least one indicator corresponding to the open configuration or the closed configuration.

5. The system of claim 1, wherein the first quantity of the liquid is defined at least in part by a location of the inlet relative to a reservoir bottom.

6. The system of claim 1, wherein the outlet is at an end of a tubular member extending away from a reservoir bottom.

7. The system of claim 1, further comprising a cover arranged over the reservoir.

8. The system of claim 7, wherein the reservoir is arranged in an interior volume of the cover.

9. The system of claim 7, wherein the reservoir is configured to be in fluidic communication with the container via a space defined between the reservoir and the cover.

10. The system of claim 1, wherein the housing comprises a double-lipped edge.

11. A system comprising:
a reservoir mountable to a container holding a liquid and comprising an inlet and an outlet, wherein the reservoir is configured to measure a predetermined quantity of the liquid while in an upright orientation, and is configured to simultaneously dispense the predetermined quantity of liquid from the outlet and receive a refilling quantity of the liquid through the inlet while in a rotated orientation that is angled relative to the upright orientation; and
a housing arranged over the reservoir and comprising an opening,
wherein the system is transitionable between an open configuration in which the opening is in fluidic communication with the reservoir and a closed configuration in which the opening is blocked from fluidic communication with the reservoir.

12. The system of claim 11, wherein the housing is movable to transition the system between the open configuration and the closed configuration.

13. The system of claim 12, wherein the housing is rotatable relative to the reservoir around a longitudinal axis to transition the system between the open configuration and the closed configuration.

14. The system of claim 11, wherein the system comprises at least one indicator corresponding to the open configuration or the closed configuration.

15. The system of claim 11, wherein the predetermined quantity of the liquid is defined at least in part by a location of the inlet relative to a reservoir bottom.

16. The system of claim 11, wherein the outlet is at an end of a tubular member extending away from a reservoir bottom.

17. The system of claim 11, further comprising a cover arranged over the reservoir.

18. The system of claim 17, wherein the reservoir is arranged in an interior volume of the cover.

19. The system of claim 17, wherein the reservoir is configured to be in fluidic communication with the container via a space defined between the reservoir and the cover.

20. The system of claim 11, wherein the housing comprises a double-lipped edge.

* * * * *